United States Patent [19]

Takeo et al.

[11] Patent Number: 5,432,713
[45] Date of Patent: Jul. 11, 1995

[54] USAGE PARAMETER CONTROL CIRCUIT FOR EFFECTING POLICING CONTROL IN AN ATM NETWORK

[75] Inventors: Hiroshi Takeo; Michio Kusayanagi; Kazuo Iguchi; Naoaki Yamanaka, all of Kawasaki; Youichi Sato, Yokohama, all of Japan

[73] Assignees: Fujitsu Limited, Kawasaki; Nippon Telegraph and Telephone Corporation, Tokyo, both of Japan

[21] Appl. No.: 996,897

[22] Filed: Dec. 28, 1992

[30] Foreign Application Priority Data

Dec. 26, 1991 [JP] Japan ................................. 3-344631
Feb. 27, 1992 [JP] Japan ................................. 4-040793

[51] Int. Cl.6 ........................... G04F 5/00; H04J 3/16; G08C 19/00
[52] U.S. Cl. ..................................... 364/514; 364/569; 340/79; 340/80; 340/82; 340/94.1; 340/825.57; 340/825.65
[58] Field of Search .................... 364/514, 569; 370/79, 370/80, 82, 8384, 94.1; 379/89; 340/825.57, 825.65

[56] References Cited

U.S. PATENT DOCUMENTS 4,475,192 10/1984 Fernow et al. ...................... 370/94
4,969,146 11/1990 Talitty et al. .................... 370/85.1 X
5,138,607 8/1992 Thiebaut et al. ...................... 370/13
5,258,247 10/1993 Hirose et al. .................. 370/94.1 X

FOREIGN PATENT DOCUMENTS 0403995 12/1992 European Pat. Off. .

OTHER PUBLICATIONS

Guillemin et al., "The Spacer–Controller: Architecture and First Assessments", *Broadband Communications*, Jan. 1992, pp. 313–323.
Song et al., "Optimizing Bulk Data Transfer Performance: A Packet Train Approach", *Computer Communication Review*, vol. 18, No. 4, Aug. 1988, pp. 134–145.

*Primary Examiner*—Emanuel T. Voeltz
*Assistant Examiner*—Kamini S. Shah
*Attorney, Agent, or Firm*—Greer, Burns & Crain, Ltd.

[57] ABSTRACT

A usage parameter control circuit for effecting a policing control in an ATM transmission network, comprising a time interval measuring unit for measuring a time interval between a current arrival time of a cell to be judged, and an arrival time of a cell which arrived a reference threshold number of cells before the currently arriving cell arrives; and a judging unit for judging whether or not the measured time interval is shorter than a reference threshold time interval, whereby a longer accessing time is allowed and the circuit construction has a flexible expandability.

39 Claims, 29 Drawing Sheets (JUDGE)

(FORM)

(SHIFT)

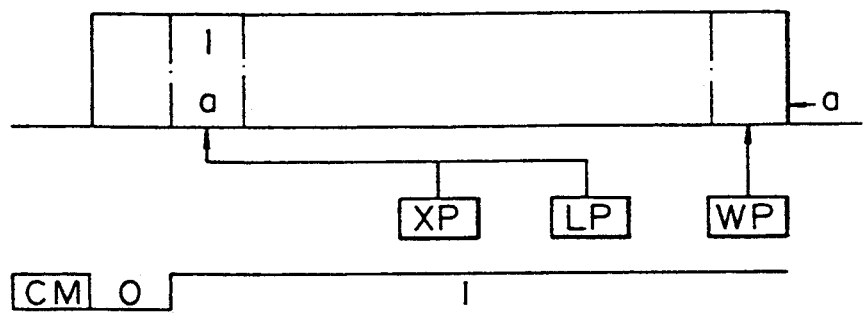
Fig. 14A (JUDGE)
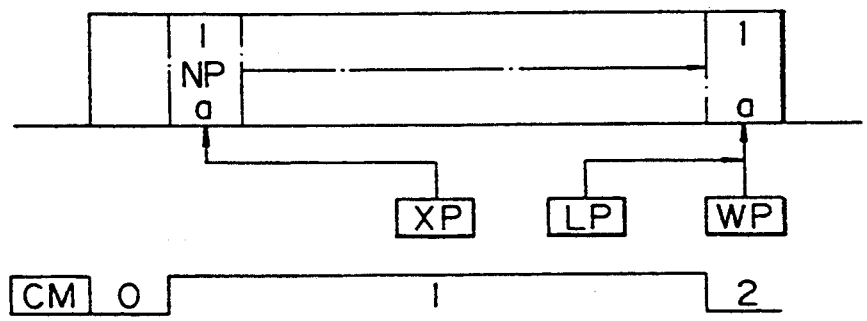
Fig. 14B (ADD)
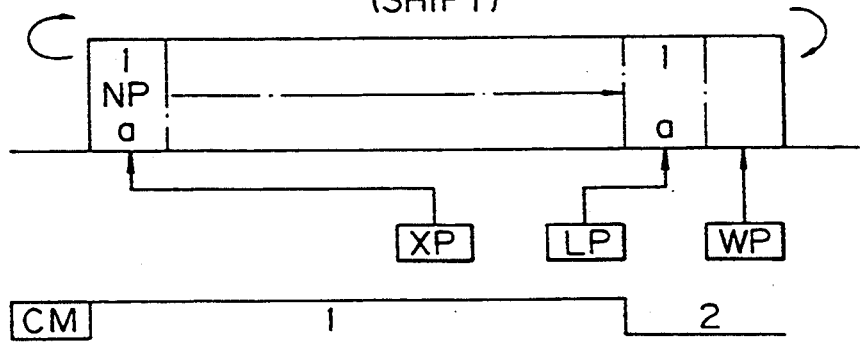
Fig. 14C (SHIFT)

(JUDGE)

(FORM)

(SHIFT)

(JUDGE)

(REWRITE)

(SHIFT)

(JUDGE)

(DISCARD CELL)

(SHIFT)

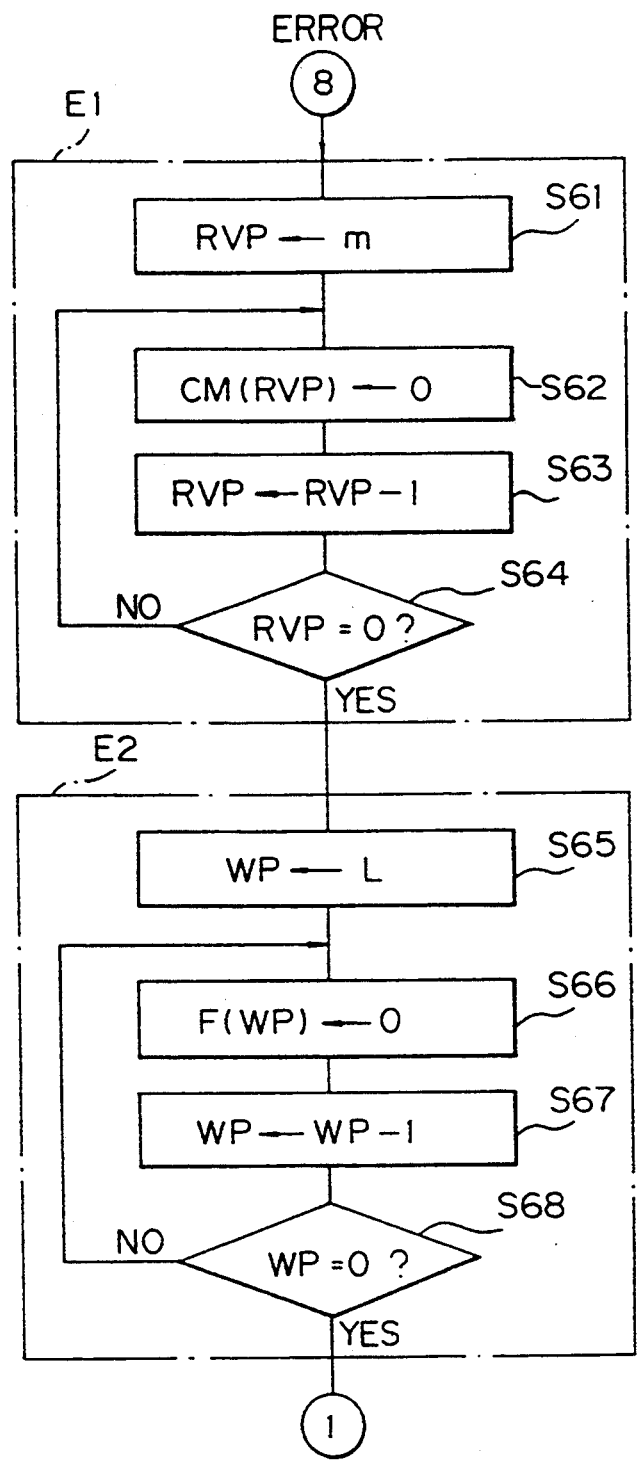

(JUDGE)

(FORM)

(SHIFT)

(JUDGE)

(A:ADD, P:REWRITE)

(SHIFT)

Fig. 27A (JUDGE)
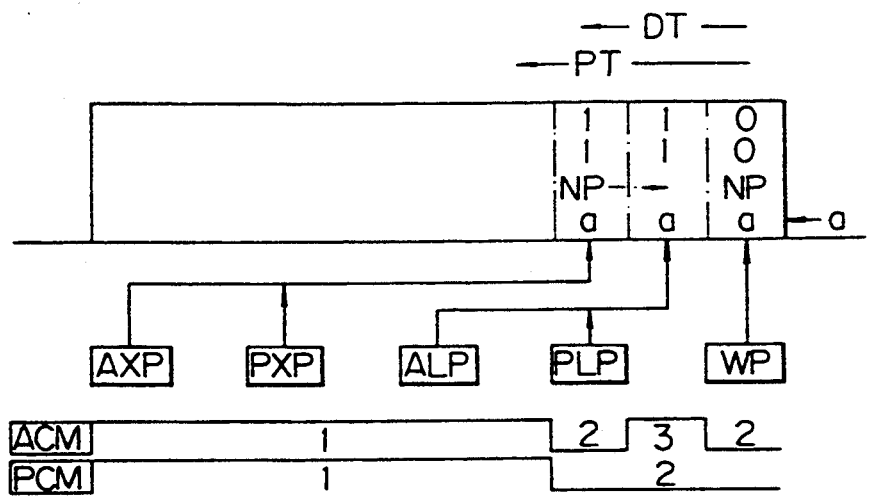
Fig. 27B (A:ADD, P:DISCARD)
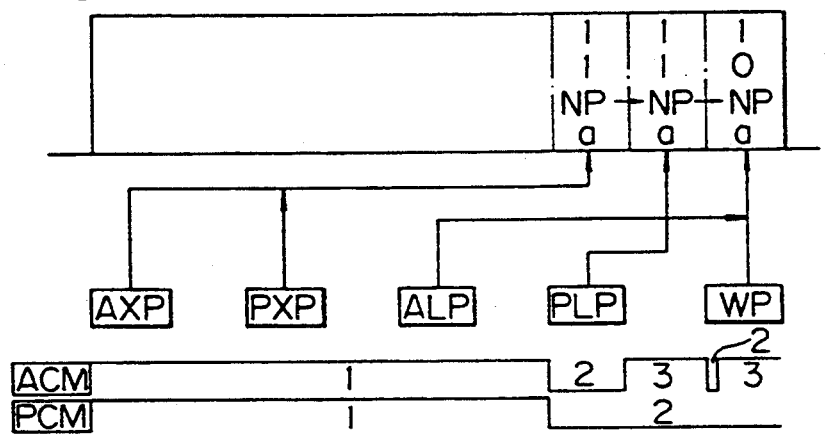
Fig. 27C (SHIFT)
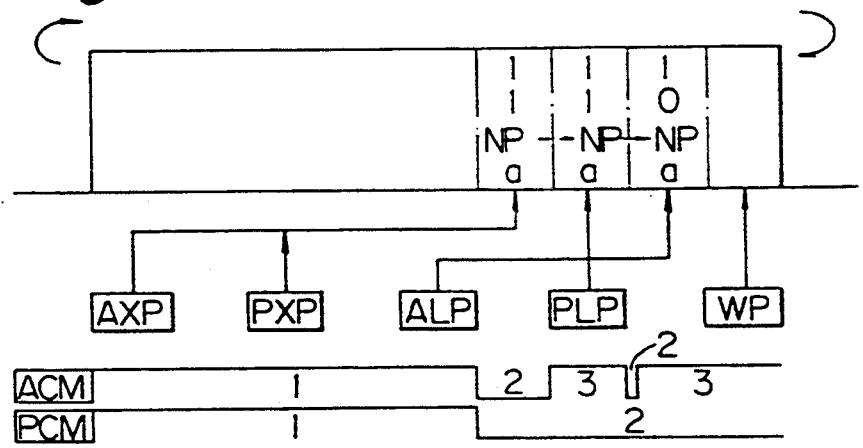

TIME INTERVAL METHOD

T-X METHOD

DB METHOD

USAGE PARAMETER CONTROL CIRCUIT FOR EFFECTING POLICING CONTROL IN AN ATM NETWORK

BACKGROUND OF THE INVENTION

(1) Field of the Invention

The present invention relates to a usage parameter control (UPC) circuit for controlling a flow amount of cells based on reference threshold information relating to cell traffic.

As a basic technology for a Broadband Aspects of Integrated Services Digital Network (B-ISDN), an Asynchronous Transfer Mode (ATM) technology for asynchronously transferring cells has been developed. In the ATM network, the amount of cell flow is controlled based on traffic parameters declared by subscribers. This control is called policing control or a Usage Parameter Control (UPC) which is an essential technology for smooth operation of the ATM network. The user declaration traffic parameters, however, are different depending on the subscribers. This difference makes it difficult to realize a UPC circuit.

(2) Description of the Related Art

As a conventional policing control method, a time interval method has been proposed in which the cell transmission is controlled by counting cell arrival time intervals for respective cells and by comparing each time interval with a reference threshold time.

Another conventional policing method has been proposed such as a T—X method in which the number of cells arriving within a reference threshold time period are measured and the number is compared with a reference threshold value to control the cell transmission.

Still another conventional method has been proposed such as a dangerous bridge (DB) method in which the number of cells arriving during a reference threshold time are counted while the starting time point of the reference threshold time period is shifted by one cell transmission time at the time of each counting operation, and the counted number is compared with a reference threshold number of cells, to control the cell transmission.

In the time interval method, the cell arrival time interval is determined for each cell so that there is a small amount of flexibility in the continuous control of cell speed.

The T—X method has a large amount of flexibility in the continuous control of cell speed, however, when cells are concentrated at a boundary region of the reference threshold time period, these cells cannot be efficiently restricted.

In the conventional DB method, a plurality of taps in a bridge memory must be accessed each time a cell arrives. This simultaneous access of plural taps is difficult to realize because the memory access time is restricted to a certain period. In addition, there is another problem in the conventional DB method in that, if a software error is generated in a memory or in a counter, the error does not disappear within a limited time period.

Accordingly, in the conventional UPC circuit, since the parameters declared by subscribers are different depending on the subscribers, and if all of the parameters are to be taken into consideration, the conventional UPC circuit has a disadvantage of being too complex and requiring large amounts of hardware.

An object of the present invention is to provide a new UPC circuit having a simple traffic judgement unit and being superior in general purpose characteristics and flexible expandability.

SUMMARY OF THE INVENTION

To attain the above object, there is provided, according to the present invention, a usage parameter control circuit for effecting a policing control in an ATM transmission network to restrict transmission of an arriving cell when the arriving cell is in violation of at least one of usage parameters declared by a subscriber, comprising: a time interval measuring unit for measuring a time interval between an arrival time of currently arriving cell to be judged as to whether or not the cell is in violation, and an arrival time of a cell which arrived a reference threshold number of cells before the currently arriving cell arrives; and a judging unit for judging whether or not the measured time interval is shorter than a reference threshold time interval, the reference threshold number of cells and the reference threshold time interval being at least a part of the usage parameters declared by the subscriber, the currently arriving cell being judged to be in violation of the usage parameters when the measured time interval is shorter than the predetermined time interval.

According to an aspect of the present invention, the time interval measuring unit comprises a memory for storing the arrival time of the cell which arrived the reference threshold number of cells before the currently arriving cell arrives; and the usage parameter control circuit further comprises a cell discarding unit; the judging unit judging, based on the judgement of whether or not the measured time interval is shorter than the reference threshold time interval, whether or not the number of cells passed within the reference threshold time interval is larger than the reference threshold number of cells; and the cell discarding unit discarding the currently arriving cell when the judging unit judges that the number of cells passed within the reference threshold time interval is larger than the reference threshold number of cells.

According to another aspect of the present invention, the time interval measuring unit comprises a bridge memory for storing, in a time sequence, at least one cell type of cells arriving at the input of the bridge memory; and a first pointer holding unit for holding a first pointer indicating a storing position of a cell type, stored in the bridge memory, of a cell, the stored cell type being the same as the cell type of an arriving cell to be judged; and the judging unit comprises a control unit for judging whether or not an arriving cell to be judged is in violation by controlling the bridge memory and the first pointer holding unit.

Preferably, the control unit comprises a comparing unit for comparing the time interval determined, each time a cell to be judged arrives at the input of the bridge memory, by a difference between the storing position indicated by the first pointer holding unit and the input position of the bridge memory with the reference threshold time interval, whereby the arriving cell is judged to be in violation when the measured time interval is shorter than the reference threshold time interval.

Preferably, when the control unit judges that the arriving cell is not in violation, the control unit controls the first pointer holding unit to store the position information of the cell type of the arriving cell at the input of the bridge memory.

Preferably, the usage parameter control circuit further comprises a counting unit for counting the number of cell types or cells, the cell types being stored in the bridge memory, the cell types of the cells being the same as the cell type of an arriving cell to be judged; the control unit controlling the counting unit to count the number of cell types of the cells up to a certain number n from a cell type at the input of the bridge memory (BM) to an already stored cell type.

Preferably, the certain number n is a reference threshold number of cells declared by a subscriber.

Preferably, when the count value of the counting unit is smaller than the certain number n each time a cell to be judged arrives, the control unit judges that the arriving cell is not in violation.

Preferably, the control unit controls the first pointer holding unit to store the storing position of the cell type of a cell that arrived the number indicated by the counting unit before the currently arriving cell, the cell type being the same as the cell type of a currently arriving cell to be judged.

Preferably, the bridge memory comprises: cell type storing areas for storing cell types; and next pointer storing areas respectively related to the cell type storing areas, each of the next pointer storing areas storing a position of a cell type of a cell which arrived next to the arrival of the cell type stored in the related cell type storing area, the control unit chaining together a plurality of the cell type storing areas of cells, having .the same cell type as the cell type of a currently arriving cell to be judged, by using the next pointer storing areas.

Preferably, the circuit further comprises a last pointer holding unit for holding the storing position of a cell type of a cell which is most-recently stored in the bridge memory, the cell type being the same as the cell type of the currently arriving cell to be judged; the control unit controlling, when an arriving cell is judged not to be in violation, the last pointer holding unit so as to store the position information of the input of the bridge memory into the next pointer storing area corresponding to the position stored in the last pointer holding unit.

Preferably, when the count value of the counting unit is n when a cell to be judged arrives, the control unit controls the first pointer holding unit to record the information stored in the next pointer storing area indicated by the first pointer holding unit in the bridge memory into the first pointer holding unit.

Preferably, the bridge memory comprises at least one flag storing area corresponding to the cell type storing area, the control unit controlling the storing area in the bridge memory to be valid or invalid by using the flag storing area.

Preferably, the control circuit forcedly changes the contents of the flag storing area in a storing position, which is to be shifted, at the next timing, to the input of the bridge memory, to be invalid.

Preferably, the control circuit forcedly changes the contents of the flag storing area of a cell to be judged, which arrived before arriving the cell at the position indicated by the first pointer holding unit, to be invalid.

Preferably, the control circuit uses a plurality of the flag storing areas to perform a plurality of policing judgements.

Preferably, the first pointer holding units are provided to respectively correspond to cell types.

Preferably, the counting unit are provided to respectively correspond to the cell types.

Preferably, the last pointer holding units are provided to respectively correspond to the cell types.

Preferably, the first pointer holding units are included in a random access memory.

Preferably, the counting units are included in a random access memory.

Preferably, the first pointer holding units are included in a random access memory.

Preferably, the bridge memory is constructed by a random access memory which operates as a first-in first-out memory.

Preferably, the bridge memory stores a plurality of kinds of the cell type information.

Preferably, the storing capacity of the bridge memory (BM) is selected from one of a Tmax, Tmax+1, and $2^k$ (where k is a natural number) that is the minimum value larger than Tmax, where Tmax is the maximum value of reference threshold time intervals of plural cell types.

Preferably, the control unit comprises a hardware error detecting unit for detecting a hardware error by detecting that the count value of the counting unit is negative or larger than the number n.

Preferably, the control unit comprises a hardware error detecting unit for detecting a hardware error by detecting that, when the bridge memory is accessed by the first pointer holding unit or the last pointer holding unit, the control unit acknowledges the cell type of the cell at the accessed storing position.

Preferably, when a hardware error is detected, the control unit resets the counting unit and makes at least the flag storing areas in the bridge memory invalid.

Preferably, the counting unit is periodically reset, and at least the flag storing areas in the bridge memory are periodically made invalid.

Preferably, when the counting unit is reset, the policing process for arriving cells is not performed for a predetermined time period.

BRIEF DESCRIPTION OF THE DRAWINGS

The above object and other features of the present invention will be more apparent from the following description of the preferred embodiment with reference to the drawings, wherein:

FIGS. 14A to 14C are diagrams explaining another part of the operation of the UPC circuit shown in FIG. 9A;

FIG. 20 is a flowchart explaining the error process in the UPC circuit shown in FIG. 9A;

FIGS. 27A to 27C are diagrams explaining still another part of the operation of the UPC circuit shown in FIG. 21;

DESCRIPTION OF THE PREFERRED EMBODIMENTS

For better understanding of the present invention, the background and the technologies proposed before the present invention will first be described with reference to FIGS. 28A to 32.

Figure 28A:
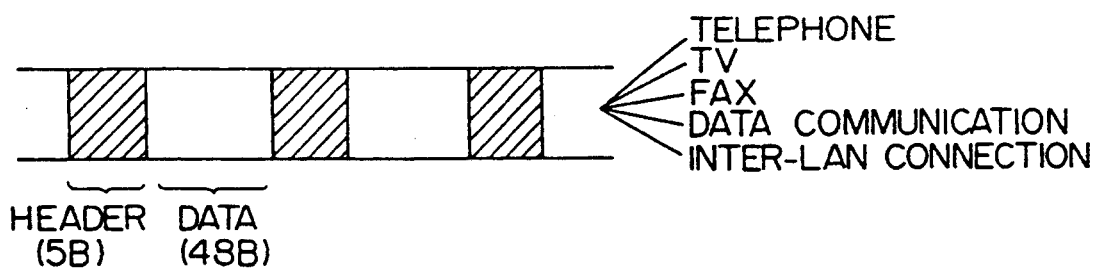
FIG. 28A is a diagram showing ATM cells on a transmission line for explaining the background of the present invention.

FIG. 28A shows ATM cells on a transmission line. Each ATM cell consists of a header part (5 bytes) and a data part (48 bytes). The subscriber side of the transmission line is connected to a sound terminal such as a telephone terminal, a visual terminal such as a television terminal, a facsimile terminal, a data communication terminal, an inter-LAN connection terminal, or so on.

Figure 28B:
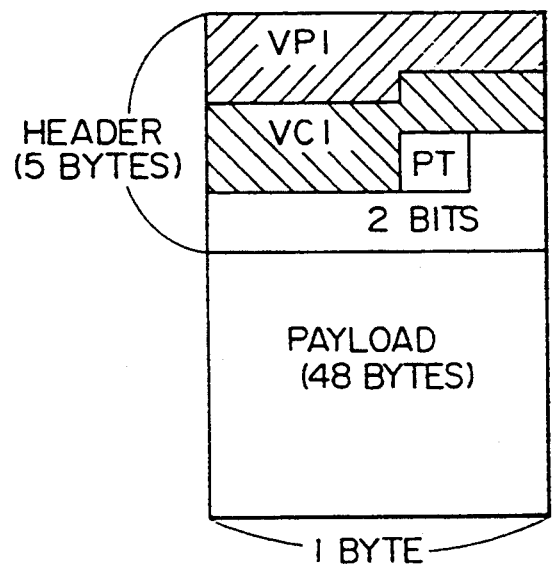
FIG. 28B is a diagram explaining a basic structure of the ATM packet for explaining the background of the present invention.

FIG. 28B shows the basic structure of the ATM cell. As shown in FIG. 28B, the ATM cell is constructed of the header of 5 bytes and a payload of 48 bytes comprising a fixed length packet, which is asynchronously transmitted through various nodes, i.e., through a path between cross-connect units in an ATM transmission network. By the ATM transmission, only when information to be sent is generated is a fixed length packet (hereinafter referred to as a cell) transmitted. Therefore, the efficiency of use of the line is high, and all kinds of data rates can be handled by one technology. Accordingly, in the ATM transmission network, it is not necessary to allocate a time slot so that the ATM transmission network is suitable for a dispersion process control and is flexibly adapted to a multiplexed transmission in comparison with a synchronous transfer mode (STM).

When such an ATM transmission network is used for a subscriber system, if subscribers are allowed to freely transmit a cell, imbalance is generated among the subscribers depending on the frequency of the generation of the information. To prevent the imbalance, a contract is made between a supplier of the network located in each node and a subscriber with respect to an upper limit of the cells which can be transmitted within a unit time so that each subscriber transmits cells in accordance with the contract, and the supplier of the network checks, at the input of the network, whether or not the subscriber is transmitting the cells within the scope of the contract, so as to protect the network. This checking function is called policing control.

Figure 29:
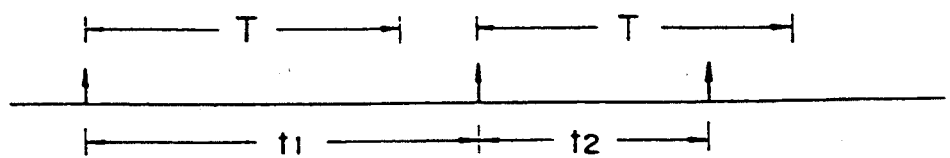
FIG. 29 is a diagram explaining a time interval method proposed prior to the present invention.
Figure 30:
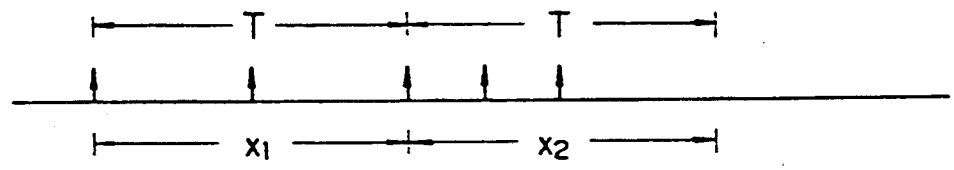
FIG. 30 is a diagram explaining a T—X method proposed prior to the present invention.
Figure 31:
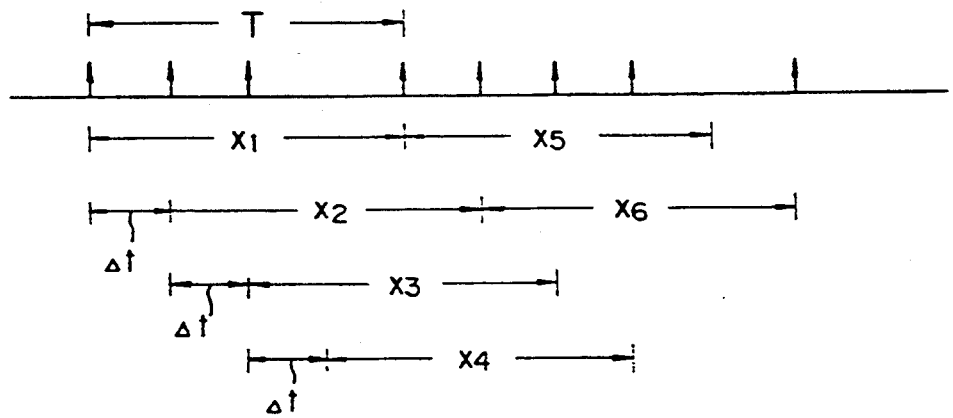
FIG. 31 is a diagram explaining a DB method proposed prior to the present invention.

FIGS. 29 to 31 are diagrams for explaining the already proposed policing control methods prior to the present invention.

FIG. 29 shows a time interval method in which a time interval t between adjacent arrival cells is counted by a counter circuit, and the time t is compared with a reference threshold time period T to judge the amount of flowing cells.

By the time interval method shown in FIG. 29, the time interval is restricted for each cell so that there is a small amount of flexibility in the continuous control of cell speed.

FIG. 30 shows a T—X method in which the number of cells x arriving during a reference threshold time period T is counted by a counter circuit, and the number x is compared with a reference threshold number X to judge the amount of flowing cells.

The T—X method shown in FIG. 30 has a large amount of flexibility in the continuous control of cell speed, however, when cells are concentrated at a boundary region of the reference threshold time period, these cells cannot be efficiently restricted.

FIG. 31 shows a dangerous bridge (DB) method in which each reference threshold time period T is shifted by one cell passing time period Δt. Within each reference threshold time period T, the number x of arriving cells is counted by a counter circuit, and the number x is compared with a reference threshold number X to judge the amount of flowing cells.

Figure 32:
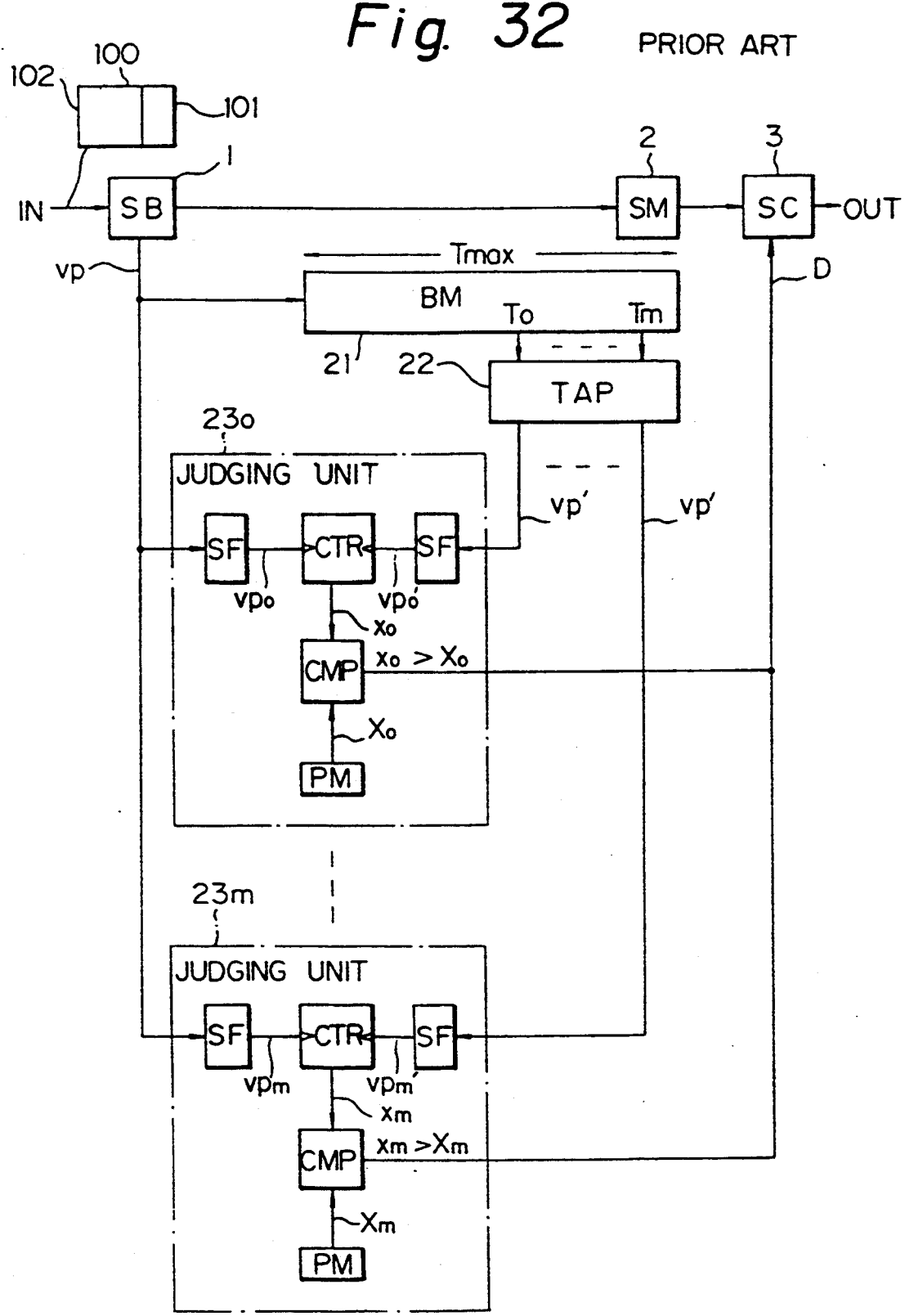
FIG. 32 is a block diagram showing a conventional UPC circuit.

FIG. 32 is a block diagram showing a conventional UPC circuit employing a DB-BM (DB-Bridge Memory) method. In the figure, 100 is a cell, 101 is a header part, 102 is a payload (data) part, 1 is a cell information branching unit (SB), 2 is a cell delaying unit (SM), 3 is a cell control unit (SC), 21 is a bridge memory (BM) having a $T_{max}$-length shift register, 22 is a multi-tap circuit (TAP), $23_0$ to $23_m$ are judging units, SF in each judging unit is a cell filter for passing a particular one of header information $VP_0, \ldots,$ and $VP_m$, CTR is a counter circuit which operates with an up/down mode, CMP is a comparator, PM is a parameter memory for storing a declared parameter $X_0, \ldots,$ or $X_m$.

When a cell arrives at an input of the highway, the header information VP in the cell is branched or copied by the cell information branching unit 1 and is temporarily stored in the cell delaying unit 2. On the other hand, the bridge memory 21 stores the branched header information VP in a time sequence. The multi-tap circuit 22 reads, from the bridge memory 21 of $T_{max}$ length, the header information VP which is delayed by a time corresponding to the time value $T_0, \ldots,$ or $T_m$ declared by the subscriber, and supplies the read header information VP to the corresponding judging unit $23_0, \ldots,$ or $23_m$.

The disadvantage of the above conventional UPC circuit is that it includes the multi-tap circuit 22 so that the wirings for the multi-tap circuit 22 are large. In addition, it is not easy to change the tap positions.

When a random access memory (RAM) is controlled as if it were a shift register, the read-out addresses of the RAM can be made to correspond to the declared time values $T_0$ to $T_m$ so that the multi-tap circuit may be removed from the UPC circuit. Even when the multi-tap circuit is not used, however, according to the DB-BM method, it is necessary to simultaneously read the header information $VP_0'$ to $VP_m'$ from a plurality of read-out addresses each time a cell arrives at the input of the bridge memory 21. Therefore, an access conflict occurs so that it is difficult to realize the control of the reading operation in the RAM.

Instead of the single bridge memory 21 common to all of the judging units $23_0$ to $23_m$, plurality of bridge memories may be provided to correspond to the judging units $23_0$ to $23_m$ (Japanese Patent Application No. 3-204285). This construction, however, increases the amount of hardware.

DETAILED DESCRIPTION OF THE PREFERRED EMBODIMENTS

In the following, embodiments of the present invention will be described in detail with reference to the accompanying drawings. Throughout the description and the drawings, the same reference symbols represent the same or similar parts.

Figure 1:
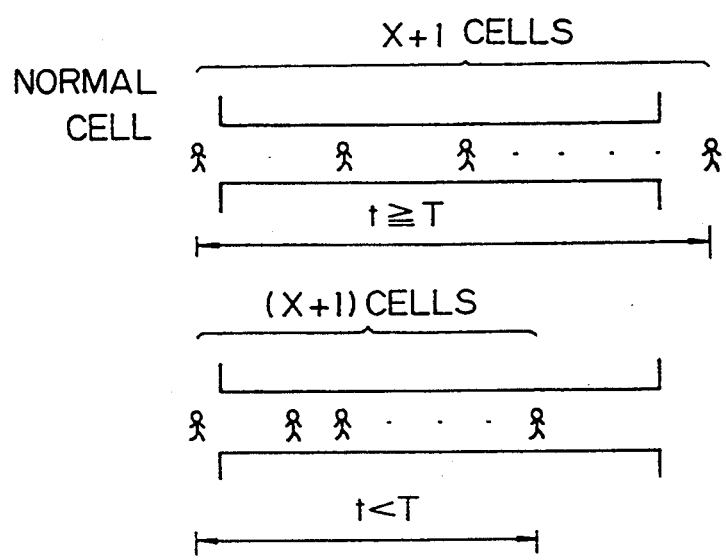
FIG. 1 is a diagram explaining the principle of the first embodiment of the present invention.

FIG. 1 is a diagram explaining the principle of the first embodiment of the present invention. According to the first embodiment of the present invention, a policing control is executed by reversing the relationship between the reference threshold time T and the reference threshold number X of cells from the relationship in the above-mentioned conventional DB method.

Namely, as shown in FIG. 1, when the time interval t in which (X+1) cells have arrived exceeds the reference threshold time period T, it is judged that the density of the transmitted cells is small so that the cells are judged as normal, i.e., the cells are not in violation of the declared parameters. On the contrary, when the time interval t in which (X+1) cells have arrived is within the reference threshold time period T, it is judged that the density of the transmitted cells is large so that the cells are judged as being in violation of the declared parameters.

Thus, by supervising the arrival time of the cell to be judged and by comparing the time interval t, in which the reference threshold number X of cells have arrived, with the reference threshold time period T, the number of cells in the reference threshold time period T can be restricted to a number smaller than the reference threshold number X.

Figure 2:
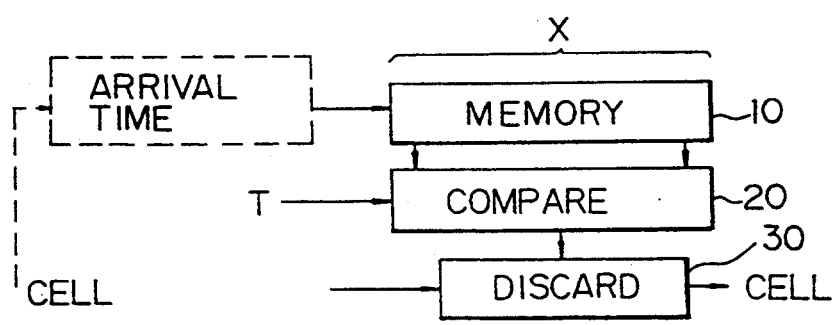
FIG. 2 is a block diagram explaining the principle of the first embodiment of the present invention.

The principle shown in FIG. 1 can be realized by a UPC circuit shown in FIG. 2. As shown in FIG. 2, the UPC circuit according to the first embodiment of the present invention includes a memory 10 comprising a shift register for storing arrival times of cells to be judged, a comparator 20 for comparing the time interval t, in which the reference threshold number X plus 1 of cells have arrived, with the reference threshold time period T and for judging whether or not the number of cells passed within the reference threshold time period T exceeds the reference threshold number X, and a discarding unit 30 for discarding the cells when the output signal from the comparator 20 represents that the cells are in violation of the declared value because the number of the cells exceeds the predetermined number x so as to restrict the number of the cells to be smaller than the reference threshold number X.

Accordingly, in the first embodiment of the present invention, the arrival times of the arriving cells are stored in the shift register 10, and the comparator 20 compares the time interval t in which (X+1) cells have arrived with the reference threshold time period T, whereby the number of cells passed within the reference threshold time period T can be restricted to be smaller than the reference threshold number X by the discarding unit 30.

As a result, it is not necessary to perform a plurality of memory accesses at the same time each time cell arrives so that the memory accessing speed can be quite low in comparison with the conventional DB-MB method employing a RAM.

Figure 3:
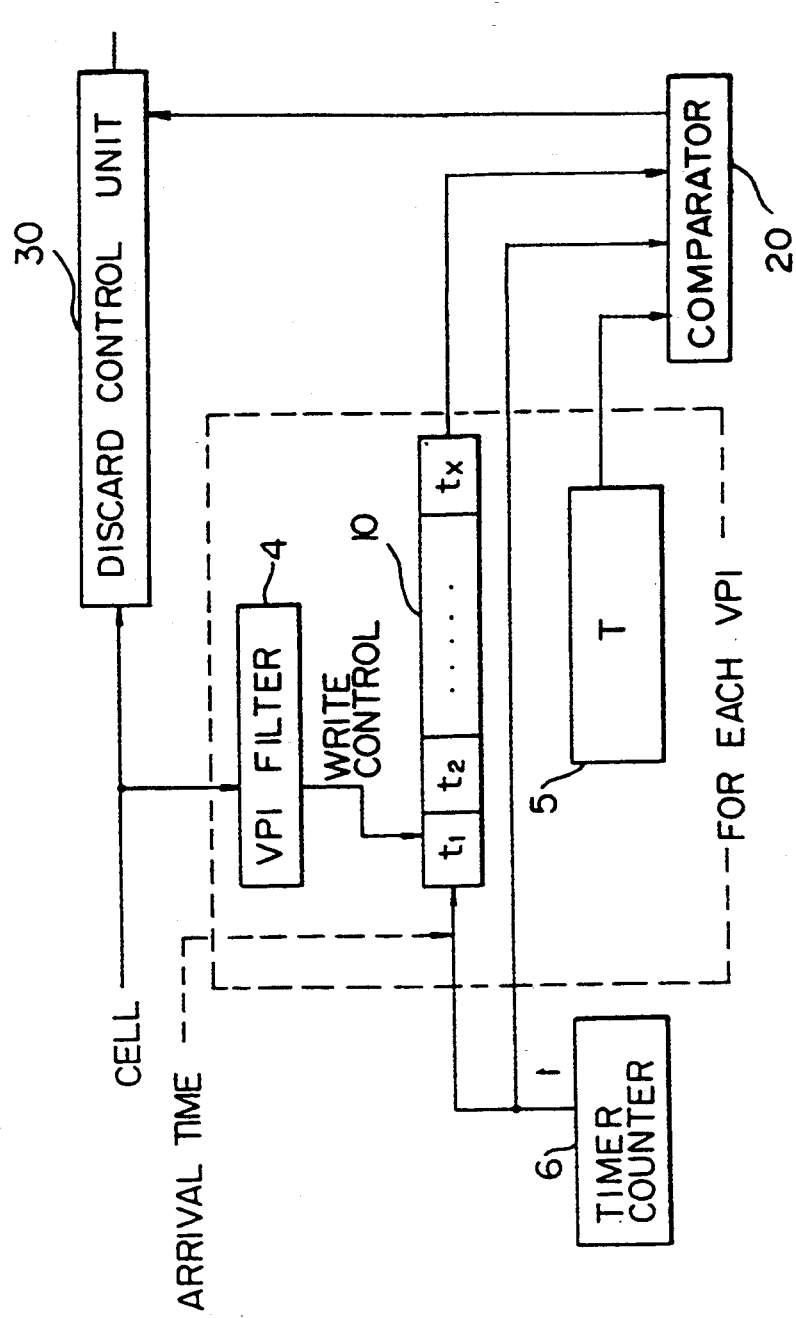
FIG. 3 is a block diagram showing a usage policing control circuit according to the first embodiment of the present invention.

FIG. 3 is a block diagram showing a UPC circuit according to the first embodiment of the present invention. In the figure, 10 is a memory such as a logical shift register constructed by a random access memory (RAM) and pointers, for storing arrival times of X cells to be judged, 20 is a comparator for comparing a time difference between the current time t and the oldest time $t_x$ in the shift register 10 with a reference threshold time period T, and 30 is a discard control unit for controlling the output or discard of the cells based on the comparison result from the comparator 20.

A reference numeral 5 is a policing parameter generating unit for generating the reference time value T, and 6 is a timer counter for generating time values which are given to the shift register 10 and the comparator 20.

In this embodiment, as an attribute of the cell, virtual path identifiers (VPI) are used. The policing control is carried out for a reference threshold VPI. To this end, a VPI filter 4 is provided between the input highway and the shift register 10. The VPI filter 3 passes only the reference threshold VPI. As an Alternative to using the VPI, virtual channel identifiers (VCI) may also be used as the attribute of the cells.

The VPI filter 4, the shift register 10, and the policing parameter generating unit 5 are enclosed by a dotted line in the figure represent that they are provided for each VPI.

In the operation of the UPC circuit shown in FIG. 3, when a cell is input to the UPC circuit, a VPI assigned to the UPC circuit shown in FIG. 3 is detected by the VPI filter 4. When the VPI is detected by the VPI filter 4, a write control enable signal is applied to the memory 10 so that the time at this timing is given from the timer counter 6 to the shift register 10 and is stored therein as an arrival time $t_1$.

In the same way, each time a cell having the above-mentioned VPI assigned to the UPC circuit shown in FIG. 3 arrives, the arrival time is written in the shift register 10. When X cells having the same VPI have arrived the shift register 10 is filled with the arrival times, and the oldest arrival time $t_x$ is given to the comparator 20.

The comparator 20 receives the current arrival time t from the timer counter 6. The comparator 20 calculates the time difference $(t-t_x)$, and compares the time difference with the threshold value T generated from the policing parameter generating unit 5.

As a result of the comparison, when $(t-t_x) \geq T$ is satisfied, this indicates that it took a time longer than or equal to the reference threshold time period T for X cells to arrive, so that the cells are transmitted normally. Thus, the comparator 20 controls the discard control unit 30 to transmit the cells as they are without discarding any cells.

In contrast, when $(t-t_x) < T$ is satisfied, this indicates that the time interval during which the X cells have arrived is within the reference threshold time period T so that the cells are transmitted in violation to the declared parameter T. Thus, the comparator 20 controls the discard control unit 30 to discard the cells so that the cells are not transmitted therefrom.

Figure 4:
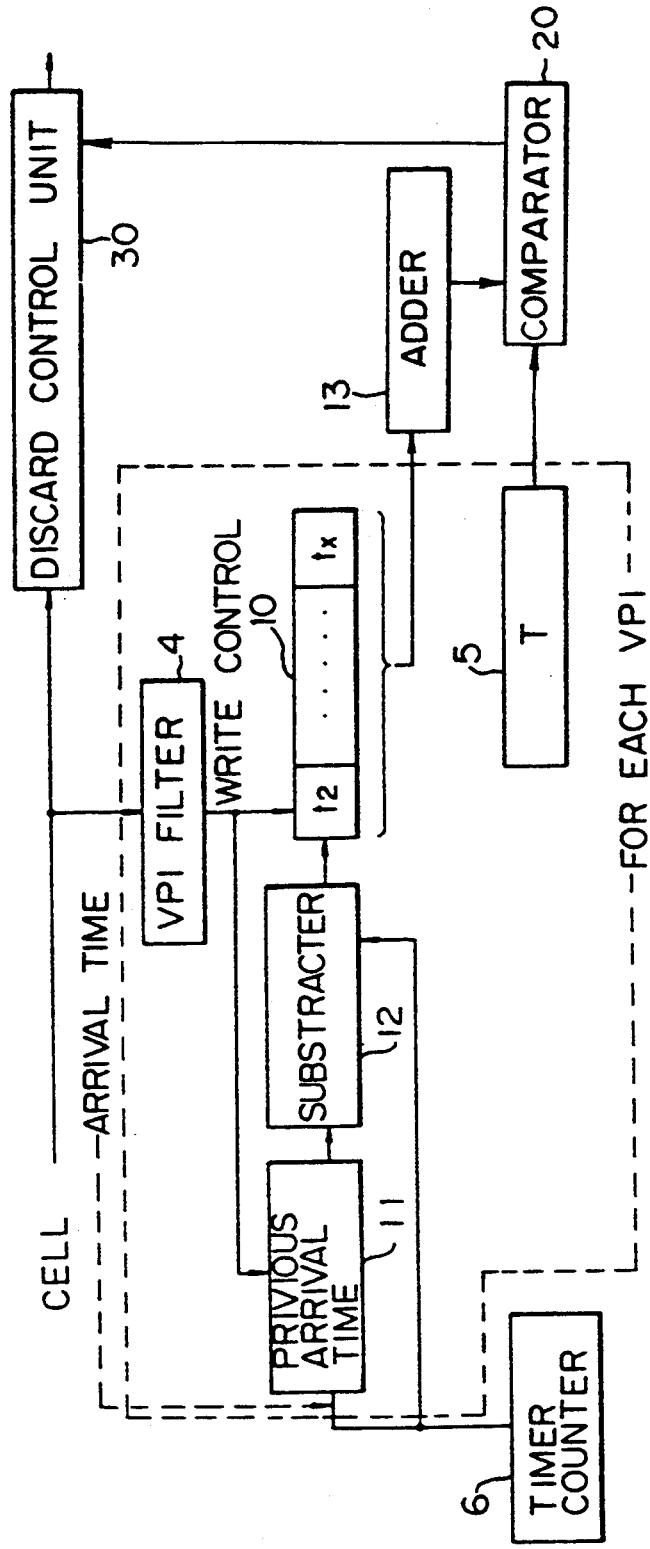
FIG. 4 is a block diagram showing a modification of the UPC circuit shown in FIG. 3.

FIG. 4 is a modification of the UPC circuit shown in FIG. 3. In the UPC circuit shown in FIG. 3, the arrival times are written in the shift register 10. In contrast, in the UPC circuit shown in FIG. 4, the arrival time interval between adjacent arriving cells is written in the shift register 10.

Namely, in FIG. 4, each arrival time is input and latched in a previous arrival time latching unit 11. a time interval between the current time and the previous time latched in the latching unit 11 is calculated by a subtracter 12. In this case, unlike the UPC circuit shown in FIG. 3, the last time $t_1$ is not necessary. The arrival times $t_2$ to $t_x$ are added by an adder 13.

Each time a cell having the predetermined VPI arrives, the time interval between adjacent cells is stored in the shift register 10. When the oldest time interval $t_x$ is stored, the time interval from the time interval $t_x$ to the time interval $t_2$ is calculated by the adder 13, resulting in the time interval $(t-t_x)$ which is the same as that in the UPC circuit shown in FIG. 3. The comparator 20 compares the time interval $(t-t_x)$ with the threshold value T to perform the discard control similar to the above example shown in FIG. 3.

Figure 5:
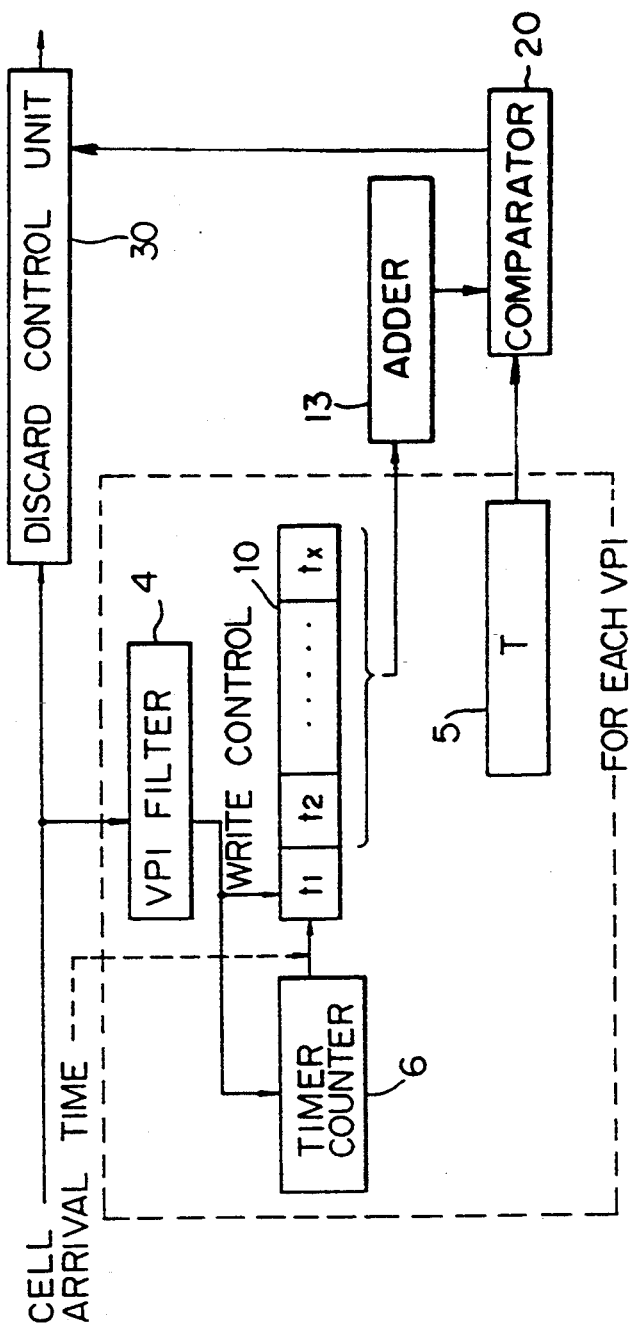
FIG. 5 is a block diagram showing a modification of the UPC circuit shown in FIG. 3.

FIG. 5 is a block diagram showing a modification of the UPC circuit shown in FIG. 3. In FIG. 5, a timer counter 6 is provided for each VPI. The timer counter 6 measures a time interval between adjacent cells. When a cell having the corresponding VPI arrives, the value of the timer counter 6 is input to the shift register 10 and the timer counter 6 is reset.

By this arrangement, only the necessary number of arrival time intervals of the cells having the VPI are stored in the shift register 10, and the output values from the shift register 10 are added by the adder 13, whereby it can be judged whether or not the arriving cells are in violation of the declared parameter. In this case, the latching unit 11 or the subtracter 12 in FIG. 4 are not necessary.

In the above examples shown in FIGS. 3 to 5, the arrival times of the cells are written in the shift register 10 even when the cells in violation are discarded. Therefore, the number of cells sent from the discard control unit 30 to the network is different from the number of cells in the shift register 10, so that a precise policing control cannot be carried out.

Figure 6:
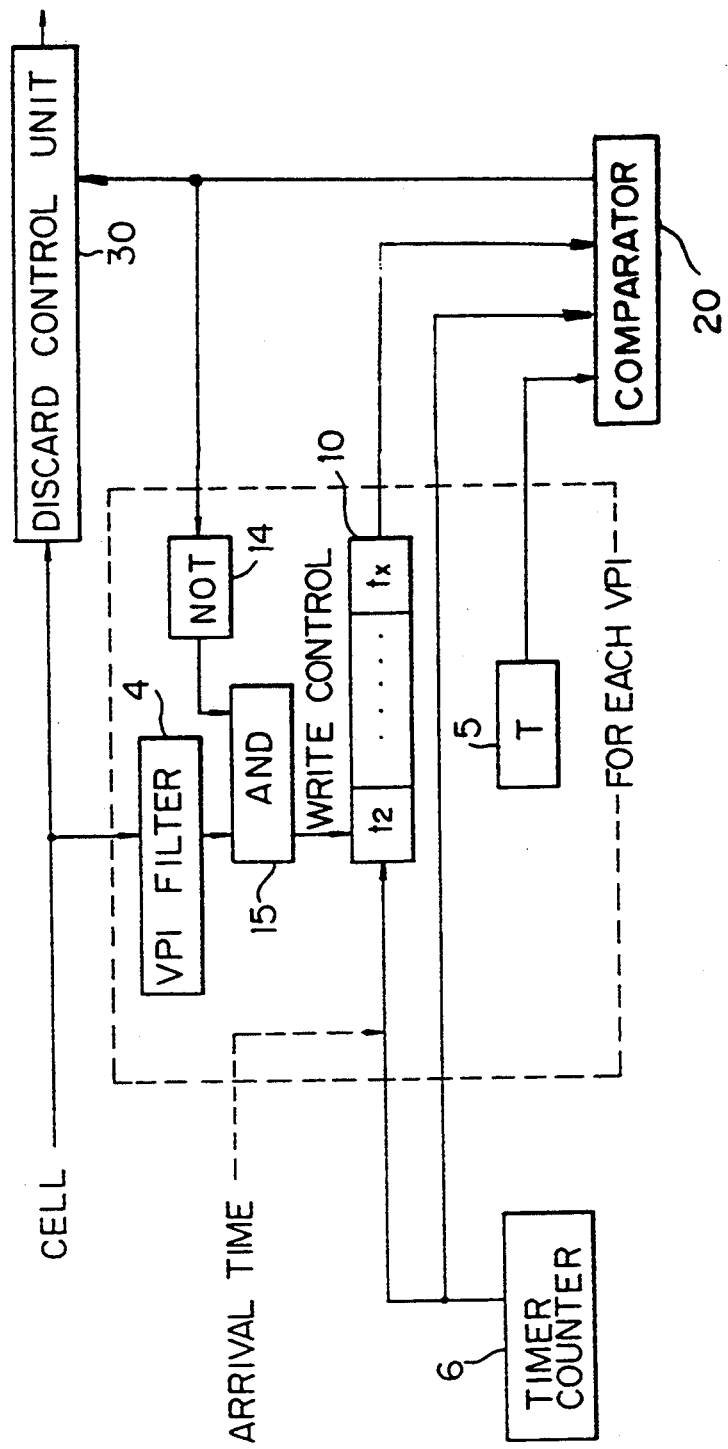
FIG. 6 is a block diagram showing a modification of the UPC circuit shown in FIG. 3.

To prevent the difference between the number of the cells in the network and the number of cells in the shift register 10, still another modification of the UPC circuit shown in FIG. 3 is provided as shown in FIG. 6.

Namely, in the example shown in FIG. 6, the control signal from the comparator 20 is supplied to not only the discard control unit 30 but also to a NOT circuit 14. The NOT circuit 14 inverts the control signal, and the inverted control signal is supplied to an input of an AND gate 15. The output of the VPI filter 4 is connected to another input of the AND gate 15. By this arrangement, even when a violating cell having the predetermined VPI detected by the VPI filter 4 arrives, the AND gate 15 does not provide the write enable signal to the shift register 10 because the NOT gate 14 outputs the inverted control signal "0". Therefore, the unnecessary arrival time is not written in the shift register 10.

Figure 7:
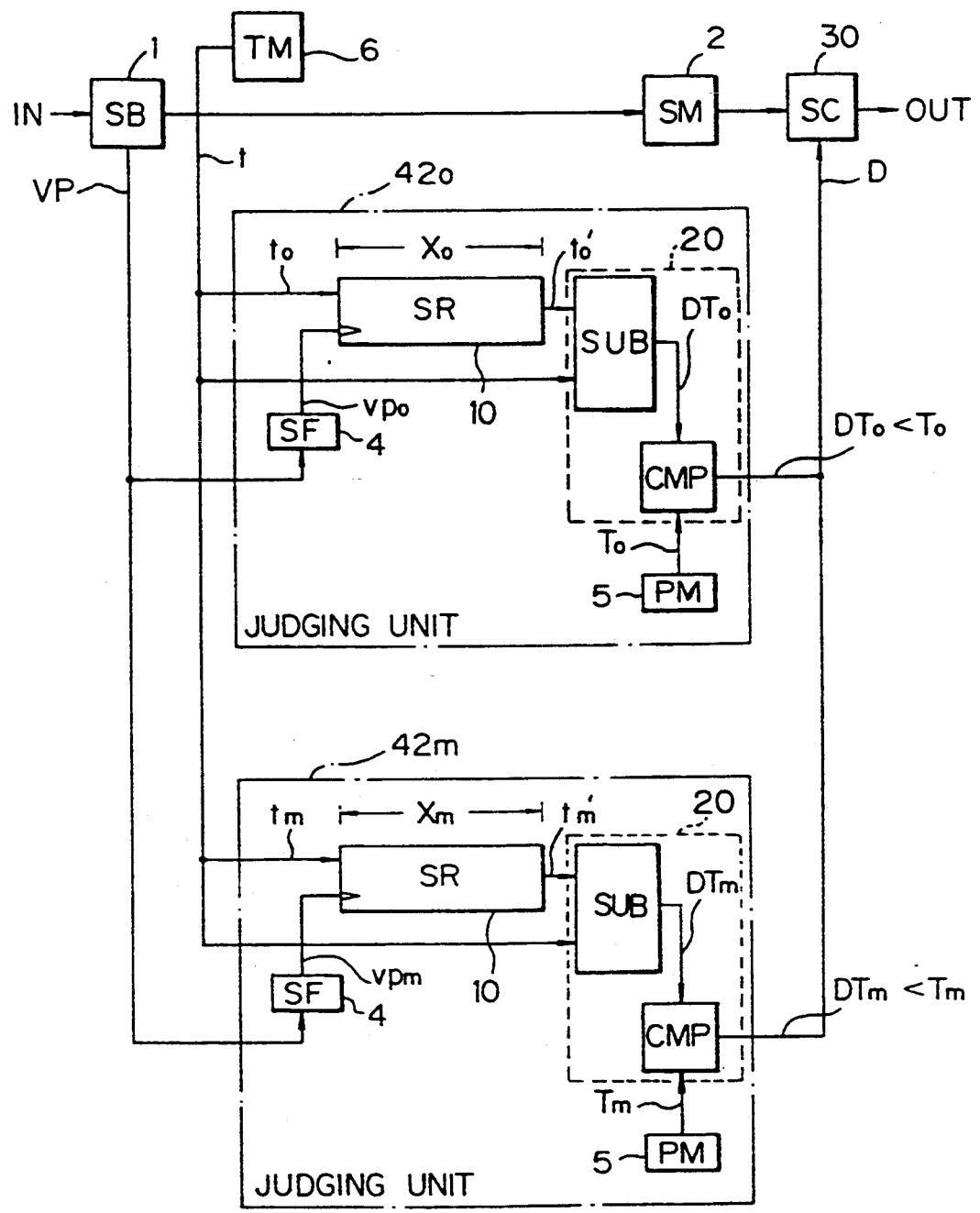
FIG. 7 is a block diagram showing in detail the UPC circuit shown in FIG. 3.

FIG. 7 is a block diagram showing in detail the UPC circuit shown in FIG. 3. The policing method carried out by the UPC circuit shown in FIG. 7 is an example of a so-called a CAT-M method.

In the figure, i is a cell information branching unit (SB), 2 is a cell delaying unit (SM), 3 is a cell control unit corresponding to the discard control unit 30 in FIG. 3, 41 is a clock timer (TM) corresponding to the counter timer 6 in FIG. 3, which generates the current time t, and $42_0$ to $42_m$ are judging units respectively corresponding to the VPIs. Each of the judging units $42_0$ to $42_m$ includes a cell filter SF for passing a cell having a VPI corresponding to the judging unit, a shift register SR corresponding to the shift register 10 in FIG. 3, a subtracter SUB and a comparator CMP corresponding to the comparator 20 in FIG. 3, and a parameter memory PM corresponding to the policing parameter generating unit 5 in FIG. 3. The number of stages of the shift register SR in the judging unit $42_i$ is the same as the declared value $X_i$ (where i=0, 1, 2, . . . , or m). The parameter memory PM in the judging unit $42_i$ stores the declared value $T_i$.

In the judging unit $42_0$, for example, when the cell filter SF detects the header information $VP_0$ the arrival time $t_0$ of the cell is written in the shift register SR. The number of the stages of the shift register ST is $X_0$. Therefore, when the cell filter SF detects the $(X_0+1)$-th header information $VP_0$, the arrival time $t_0'$ written first is read out from the shift register SR. The subtracter SUB calculates the difference between the current time t and the time $t_0'$ read from the shift register SR. Thus, the time interval $DT_0$ during which the number of the arriving cells becomes $(X_0+1)$ is output from the subtracter SUB each time one cell having the header information $VP_0$ arrives. Since the current time t is shifted cell by cell, each time interval $DT_0$ is calculated by shifting the time cell by cell.

The comparator CMP compares each time interval $DT_0$ with the reference threshold time period $T_0$ which is the declared value. When $DT_0 < T_0$ is satisfied, the cell control unit 3 discards the cell in the cell delaying unit 2; and when $DT_0 \geq T_0$ is satisfied, the cell control unit 3 passes the cell.

In the other judging units $42_1$ to $42_m$, similar operations are effected as above.

According to the first embodiment described with reference to FIGS. 3 to 7, since the shift register in each judging unit has only one output terminal, it is not necessary to access the shift register at a plurality of taps each time a cell arrives. Therefore, the accessing time for accessing the shift register can be longer than that in the conventional circuit.

The first embodiment, however, has a plurality of shift registers $42_0$ to $42_m$ respectively corresponding to the header information $VP_0$ to $VP_m$. Therefore, the UPC circuit requires a large hardware structure. In addition, since the time information t is represented by a large number of bits, the circuit scale of the shift register SR and the subtracter SUB is large.

The second embodiment of the invention addresses these concerns.

Figure 8A:
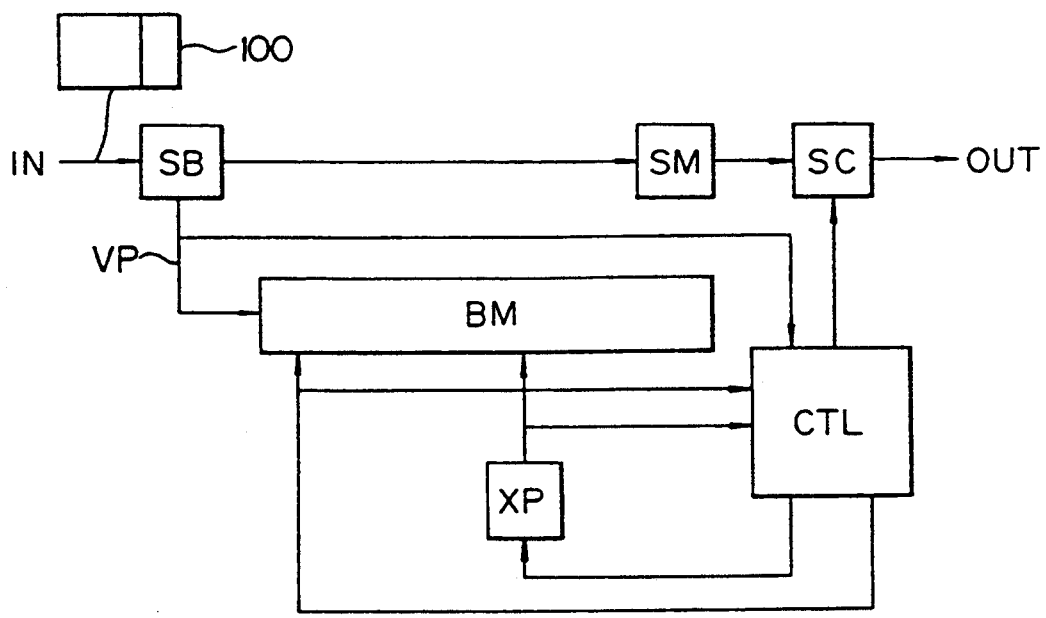
FIG. 8A is a block diagram explaining the principle of the second embodiment of the present invention.
Figure 8B:
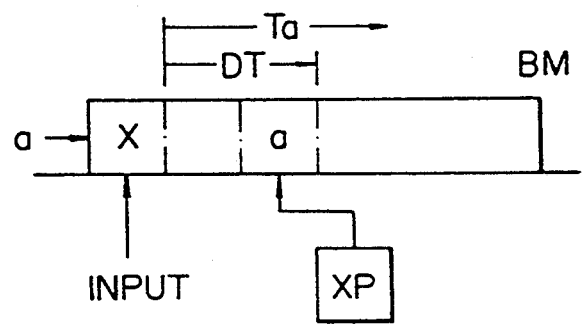
FIGS. 8B and 8C are diagrams explaining the operation of the circuit shown in FIG. 8A.
Figure 8C:
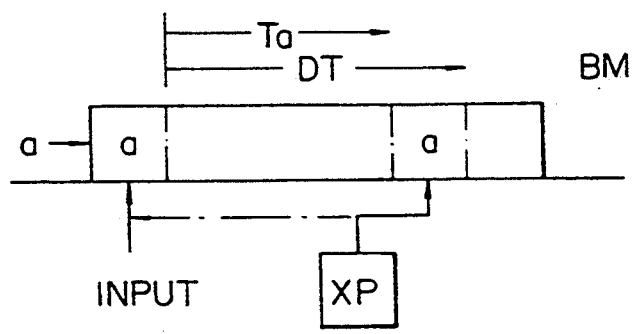

FIG. 8A is a block diagram explaining the principle of the second embodiment of the present invention. FIGS. 8B and 8C are diagrams explaining the operation of the circuit shown in FIG. 8A.

In FIG. 8A, a UPC circuit according to the second embodiment includes a bridge memory BM for storing cell type information of the arriving cells in a time sequence, a first pointer holding unit XP for holding the stored positions of the header information of the cells stored in the bridge memory BM, and a control unit CTL for effecting a policing judgement by controlling the bridge memory BM and the first pointer holding unit XP. SB is a cell information branching unit, SM is a cell delaying unit, and SC is a cell control unit. The numeral 100 represents a header in a cell.

When a cell arrives at the input IN of a highway, the header information VP, i.e., the type information of the cell, is branched at the cell information branching unit SB, and is temporarily stored in the cell delaying unit SM. The bridge memory BM stores the type information VP of the arriving cells in a time sequence. The first pointer holding unit XP holds the storing positions of the type information VP of the predetermined cells stored in the bridge memory. The control unit CTL carries out a policing judgement by controlling these elements.

Figure 9A:
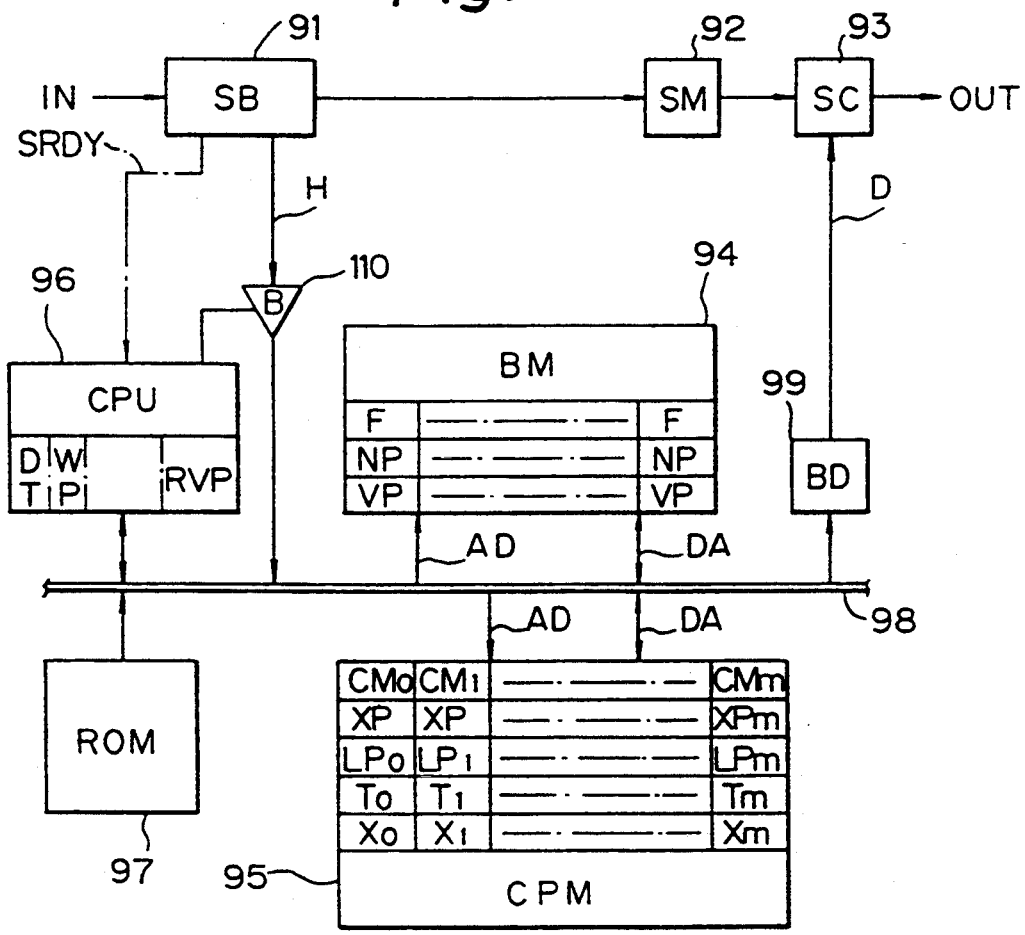
FIG. 9A is a block diagram showing a UPC circuit according to the second embodiment of the present invention.

FIG. 9A is a block diagram of the UPC circuit according to the second embodiment of the present invention. In the figure, 91 is a cell information branching unit (SB), 92 is a cell delaying unit (SM), 93 is a cell control unit (SC), 94 is a bridge memory (BM) having a length $(T_{max}+1)$ and constructed by a random access memory (RAM) where $T_{max}$ is the maximum reference threshold time period allowed in accordance with the circumference of the system as a whole, 95 is a control/parameter memory (CPM), 96 is a CPU corresponding to the control unit CTL in FIG. 8A, 97 is a read only memory (ROM) for storing control programs shown in FIGS. 10 to 12 and FIGS. 18A to 20 executed by the CPU 6, 98 is a common bus for the CPU 6, 99 is a bus decoder (BD), and 110 is a three-state buffer circuit (B).

In the bridge memory (BM) 94, a flag F, a next pointer NP, and a cell type information VP are stored for each cell. The flag F indicates whether or not the cell is valid. The next pointer NP represents the position of the next cell having the same header information in the bridge memory (BM) 94. The cell type information VP is the header information of the cell.

In the control/parameter memory (CPM) 95, five kinds of information CM, XP, LP, T, and. X are stored for each cell type information, i.e., each header information $VP_i$ (i=0, 1, ..., or m). Namely, $CM_0$ to $CM_m$ are count values counted by counter memories each of which counts the number of cells in the bridge memory (BM) 94 for each cell type information VP; $XP_0$ to $XP_m$ are first pointers each of which represents the position of a cell that arrived before arrival of a currently arriving cell with the same header information or the position of the oldest cell when the number of cells, having the same header information, in the bridge memory (BM) 94, is smaller than the reference threshold value $X_i$; $LP_0$ to $LP_m$ are last pointers each representing the position of the most-recently written cell; $T_0$ to $T_m$ are reference threshold time periods, and $X_0$ to $X_m$ are reference threshold numbers of cells.

The CPU 96 calculates a time interval DT during which X cells of the same header information have arrived, rewrites a write pointer WP, and rewrites the contents of the register RVP.

Figure 9B:
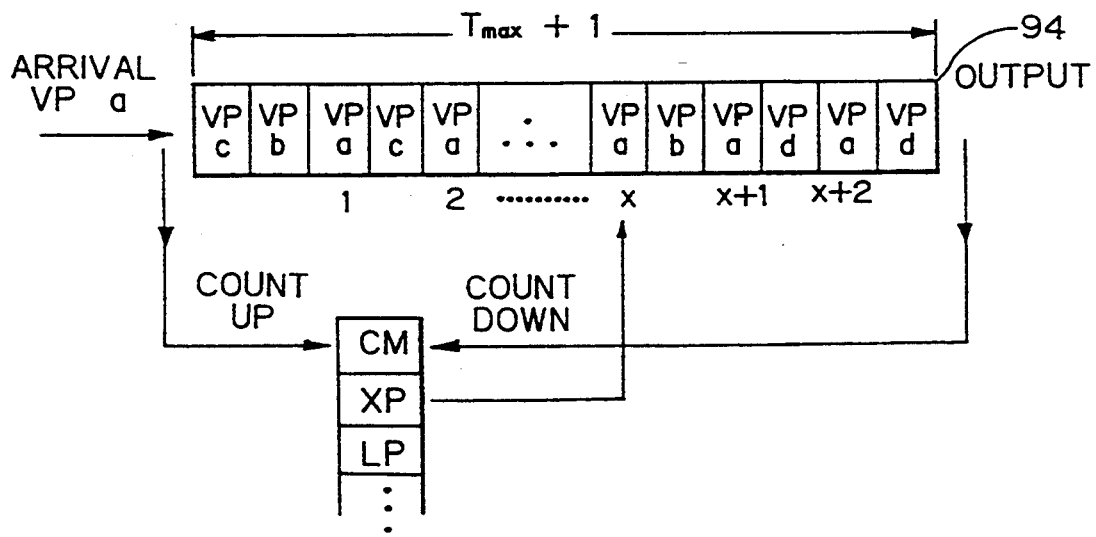
FIG. 9B is a diagram showing an example of the contents of the bridge memory shown in FIG. 9A.

FIG. 9B shows an example of the contents of the bridge memory 94. As shown in FIG. 9B, the count memory for the header information a counts up each time a cell having the header information a arrives, and counts down each time the cell with the same header information a is output from the bridge memory 94. The first pointer for the header information a indicates the position X of the cell with the header information a. After the arrival of the cell with the header information a at the position X, $(X-1)$ cells with the header information a have arrived before arrival of the currently arriving cell with the header information a.

When a cell arrives at the input IN of the highway, predetermined header information H including, for example, a Virtual Path Identifier (VPI), a Virtual Channel Identifier (VCI), a Cell Loss Priority (CLP), and so forth, is branched (i.e., copied) by the cell information branching unit 91 and is temporarily stored in the cell delaying unit 92. The CPU 96 extracts cell type information VP from the branched header information H, and measures the traffic of the arriving cells based on the type information VP to determine whether or not the arriving cells are in violation of the reference threshold traffic condition declared by the subscriber. The cell control unit 93 passes the cells in the cell delaying unit 2 as they are when the arriving cells are not in violation of the reference threshold traffic condition, and discards the cells or provides a tag to the cells when the cells are in violation of the reference threshold traffic condition.

Figure 10:
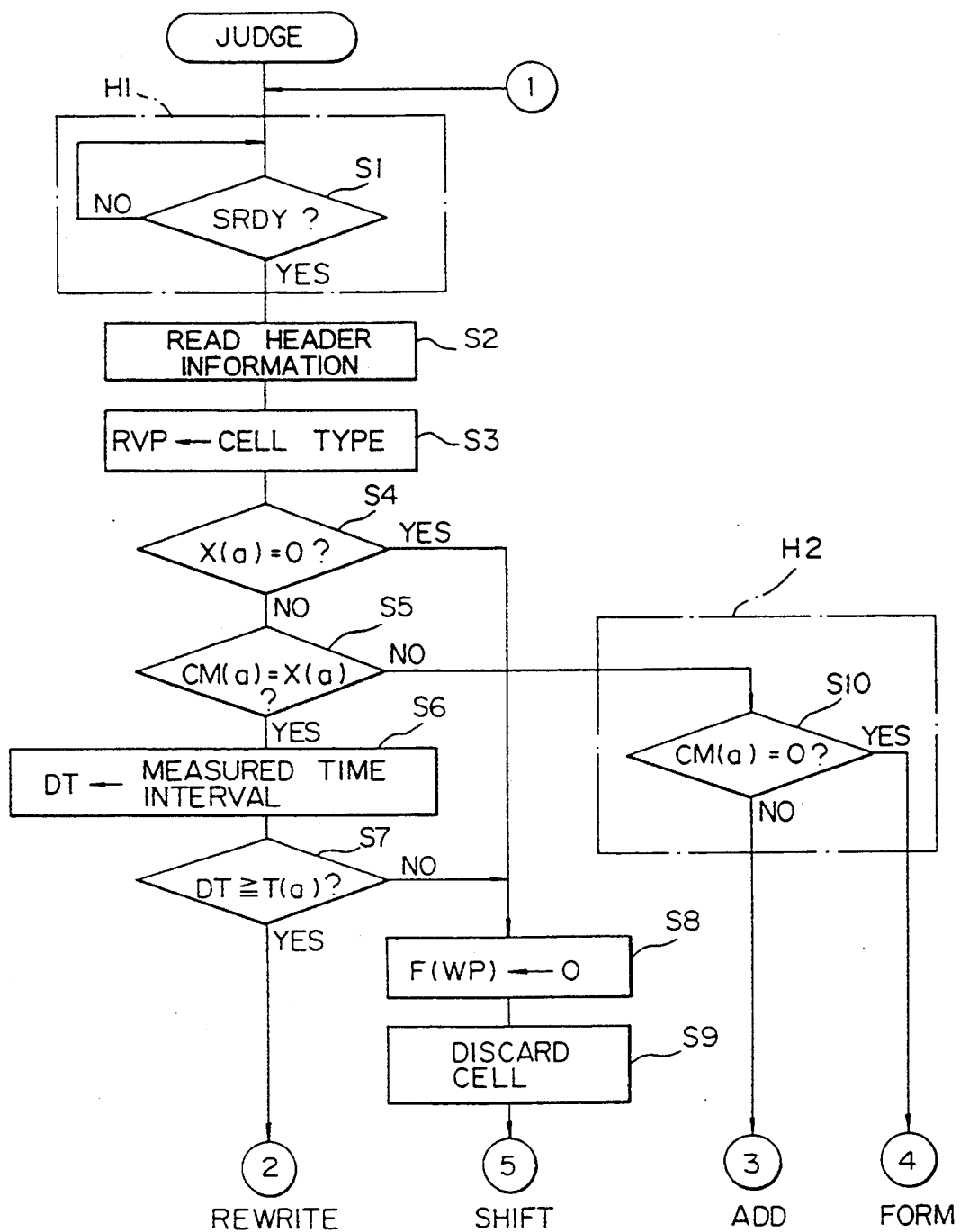
FIG. 10 is a flowchart explaining a judgement process in the UPC circuit shown in FIG. 9A.
Figure 11:
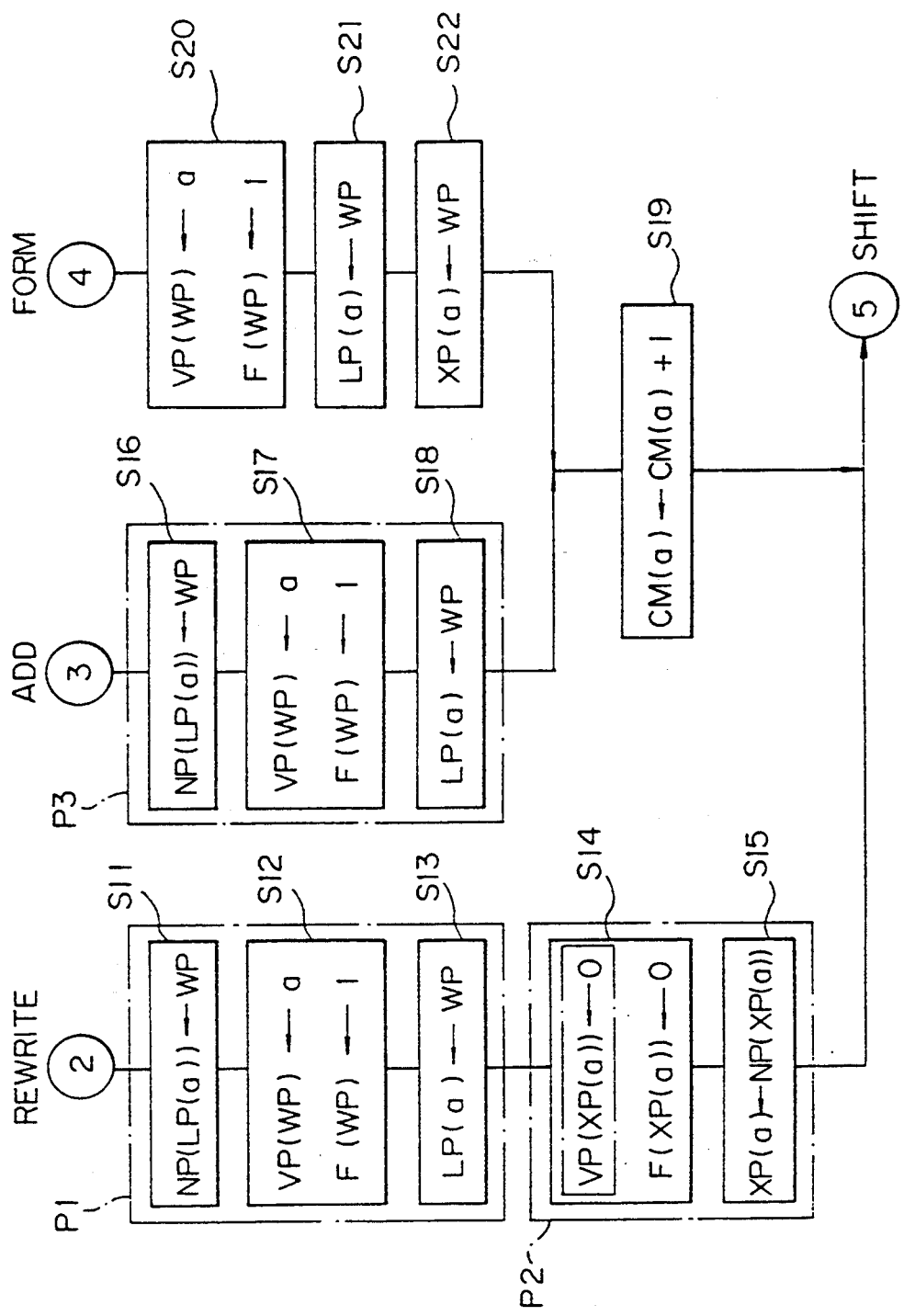
FIG. 11 is a flowchart explaining a pointer process in the UPC circuit shown in FIG. 9A.
Figure 12:
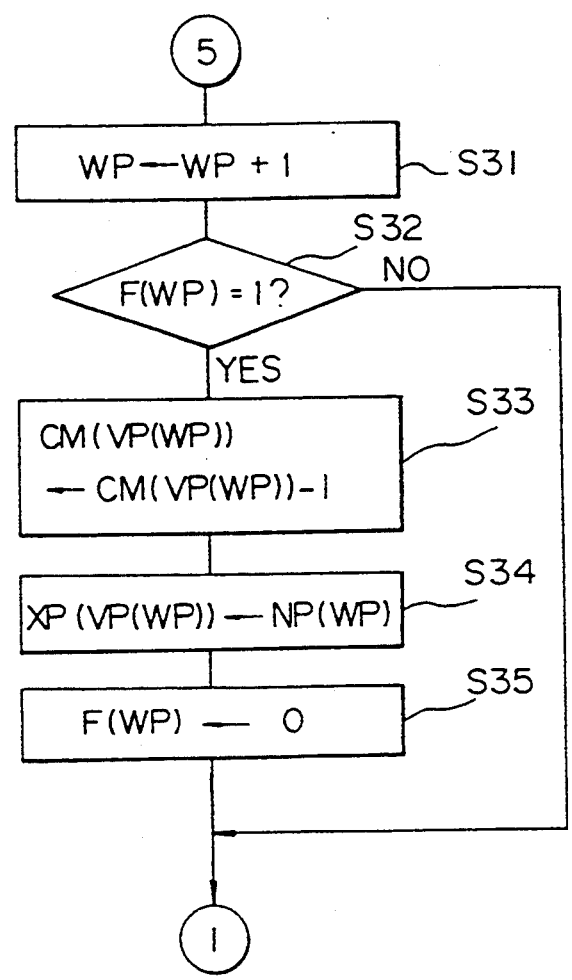
FIG. 12 is a flowchart explaining a shift process in the UPC circuit shown in FIG. 9A.

FIGS. 10 to 12 are flowcharts of a policing control process in the UPC circuit shown in FIG. 9A. FIG. 10 is a flowchart explaining the policing judgement process, FIG. 11 is a flowchart explaining a pointer process in the bridge memory, and FIG. 12 is a flowchart explaining a shift process in the bridge memory.

In the following description, an expression X(a)=0 represents that the reference threshold number $X_a$ for the cells with the cell type information a is zero. The other expressions can also be understood in a similar way. For example, CM(a) represents a count value for the cells with the cell type information a in the bridge memory (BM) 94; T(a) represents the reference threshold time period for the cells with the cell type information a; F(WP) represents the flag of the cell at the write point WP; NP(LP(a)) represents the next point of the cell at the last point LP(a); LP(a) represents the last point of the cells with the cell type information a; VP(WP) represents the cell type information of the cell at the write point WP; and so on.

When power is supplied to the UPC circuit shown in FIG. 9A, the process starts from the judgement process ① shown in FIG. 10.

JUDGEMENT PROCESS ①

At step S1, a cell arrival is waited for. When a cell arrives, at step S2, a predetermined header information H is read. At step S3, a type information VP of the cell is extracted from the read header information H, and the extracted type information VP, which is a in this example, is stored in the register RVP.

At step S4, it is judged whether or not the reference threshold number of cells X(a) is zero. When X(a)=0 is satisfied, it means that no cell with the cell type information a is to be passed. Therefore, the process proceeds to a later described step S8. If X(a)=0 is not satisfied, the process proceeds to the following step S5 to carry out a judgement based on the count value CM of the counter memory.

JUDGEMENT BY CM

At step S5, it is judged whether of not CM(a)=X(a) is satisfied. When CM(a)<X(a), this means that the number of cells with the cell type information a that arrived within the maximum time period $T_{max}$ is smaller than the reference threshold number of cells X(a) and naturally therefore, the number of cells in the reference threshold time period $T_a$ is smaller than the reference threshold number of cells X(a). Therefore, in this case, it can be directly judged that the arriving cells with the cell type information a are not in violation of the declared traffic condition and the process proceeds to step S10. At step S10, it is judged whether or not CM(a)=0 is satisfied. When CM(a)=0, this means that there is no cell with the cell type information a in the bridge memory (BM) 94 so that the process proceeds to the pointer forming process ④ in the flowchart shown in FIG. 11. When CM(a)=0 is not satisfied, the process proceeds to the pointer adding process ③ in the flowchart in FIG. 11.

When CM(a)=X(a) is satisfied at step S5, this means that the number of the cells with the cell type information a is the same as the reference threshold number X for the cell type information a. Therefore, the process proceeds to the following step S6 to judge whether or not the cells are in violation of the declared traffic condition by calculating a time interval DT.

JUDGEMENT BY DT

At step S6, a time interval DT between the input time of the currently arriving cell and the time at a storing position indicated by the first pointer XP (a) of the bridge memory (BM) 94 is calculated. Namely, when WP≧XP(a) is satisfied, DT=WP−XP(a) is calculated; and when WP<XP(a) is satisfied, DT=WP+$T_{max}$+1−XP(a) is calculated for example. At step S7, it is judged whether or not DT≧T(a) is satisfied. When DT≧T(a) is satisfied, the arriving cells with the cell type information a are not in violation of the declared traffic condition so that the process proceeds to the pointer rewrite process ② in FIG. 11. When DT≧T(a) is not satisfied, the arrival cells with the cell type information a are in violation of the declared traffic condition so that the process proceeds to the following step S8 to discard the cells.

DISCARD OF CELLS

At step S8, the flag F(WP) is changed to 0 so that the information in the storage areas relating to the flag F(WP) is made invalid (not to be used). Namely, by changing the flag F(WP) to zero, all information NP and VP for the cell at the write pointer WP is made invalid.

At step S9, a cell discard command is sent to the bus decoder 99 to discard the arriving cell with the cell type information a. Then, the process proceeds to the shift process ⑤ in FIG. 12.

POINTER FORMING PROCESS ④

When CM(a)=X(a) is not satisfied and when CM(a) is zero, this means that no cell with the cell type information a is stored in the bridge memory (BM) 94. In this case, new pointers for the arriving cell with the information a must be formed as follows. Namely, at step S20 in FIG. 11, the type information a of the arriving cell is written into the VP(WP) area, i.e., the cell type information area at the write pointer WP, in the bridge memory (BM) 94; and the related flag F(WP) is turned to 1 indicating that the arriving cell is valid or to be used. At steps S21 and S22, the last pointer LP(a) and the first pointer X(a) are both made to indicate the input position, i.e., the write pointer WP of the bridge memory (BM) 94. Then, at step S19, the count value CM(a) is incremented and the process proceeds to the shift process ⑤ in FIG. 12.

POINTER ADDING PROCESS ③

When CM(a)=X(a) is not satisfied and when CM(a) is not zero, this means that the count value CM(a) is smaller than the reference threshold number X(a) so that the arriving cell must not be discarded but must be input into the bridge memory (BM) 94. In this case, the the next pointer NP(a) and the last pointer LP(a) are added in the bridge memory (BM) 94. Namely, in a process P3 shown in FIG. 11, at step S16, the write pointer WP is written in the area of the next pointer NP(LP(a)) indicating the next pointer of the last pointer LP(a) of the cells with the information a . Then, at step S17, the cell type information a is written in the area of the VP(WP) in the bridge memory (BM) 94, and the related flag F(WP) is turned to 1, indicating that the arriving cell is with the information a and is valid. At step S18, the write pointer WP is written in the area of the last pointer LP(a) in the bridge memory (BM) 94 to indicate that the position of the most-recently input cell with the information a is the position of the write pointer WP. At step S19, the CM(a) is incremented and the process proceeds to the shift process ⑤ in FIG. 12.

POINTER REWRITE PROCESS ②

When CM(a)=X(a) at step S5 and DT≧T(a) is satisfied at the step S7 in FIG. 10, the pointers in the bridge memory (BM) 94 are rewritten. Namely, in the process P1 in FIG. 11, similar to the above-mentioned process P3, the pointers of the arrival cell with the information a are added in the bridge memory (BM) 94. In the next process P2, the pointers VP (XP(a)) and F(XP(a)) of the oldest cell with the information a which exceed the relation CM(a)=X(a) are set to zero, i.e., the pointers thereof are deleted because, when the arriving cell is input to the bridge memory (BM) 94, the oldest cell out of the X(a) cells. In more detail, at step S14, 0 is first written into the area VP indicated by the first pointer XP(a) which is the position of the oldest cell with the information a. Note that the process indicated by a dash-dot line in the step S14 may not be carried out because the oldest cell at the first pointer X(a) is no longer taken into account. Next, the flag F relating to the oldest cell at the first pointer X(a) is changed to 0 at step S14. At step S15, the contents of the next pointer NP at the first pointer XP(a) are written into the first pointer XP(a). Namely, the first pointer XP(a) becomes the next pointer. Then the process proceeds to the shift process ⑤ in FIG. 12.

SHIFT PROCESS ⑤

After the rewrite process ②, the pointer add process ③, or the pointer forming process ④, a shift process ⑤ is carried out as shown in FIG. 12. At step S31, the write pointer WP is incremented. At step S32, it is judged whether or not F(WP)=1 is satisfied. When F(WP)=0 is satisfied, this means that the unused storage area of the bridge memory (BM) 94 is returned to its input, and therefore the process returns to the judgement process ①.

When F(WP)=1 is satisfied, this means that the information of a valid cell is output from the bridge memory (BM) 94 so that a process to delete the pointers of the output cell is carried out. Namely, at step S33, the count value CM(VP(WP)) is decremented. The count value CM(VP(WP)) represents the count value CM of the cells with the cell type information VP of the cell at the write point WP. At step S34, the first pointer XP(VP(WP)) is rewritten by the next pointer NP(WP). Namely, the contents of the next pointer NP(WP) are stored in the first pointer XP of the cells with the cell type information VP(WP). At step S35, the flag F(WP) is changed to 0. Then the process returns to the judgement process ①.

FIG. 13A to FIG. 17C are diagrams explaining practical examples of the operation of the UPC circuit shown in FIG. 9A. In these examples, the reference threshold time period T is assumed to be 4, and the reference threshold number X of cells is assumed to be 2.

Figure 13A:
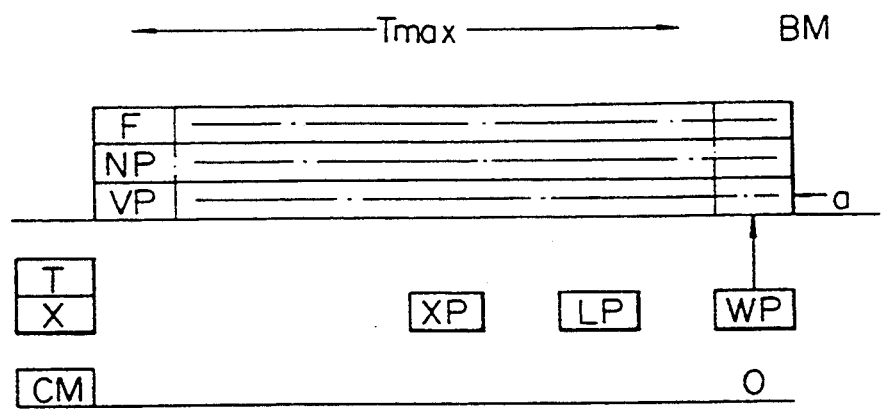
FIGS. 13A to 13C are diagrams explaining a part of the operation of the UPC circuit shown in FIG. 9A.

In FIG. 13A, it is assumed that the bridge memory BM stores no cell, and the first cell with the information a arrives at the input of the bridge memory BM. In this case, after the steps S1 to S4, since the count value CM(a) is 0, the judgement at the step S5 is NO so that the process proceeds to the step S10. The judgement at the step S10 is YES. Thus, the process proceeds to the pointer forming process ④.

Figure 13B:
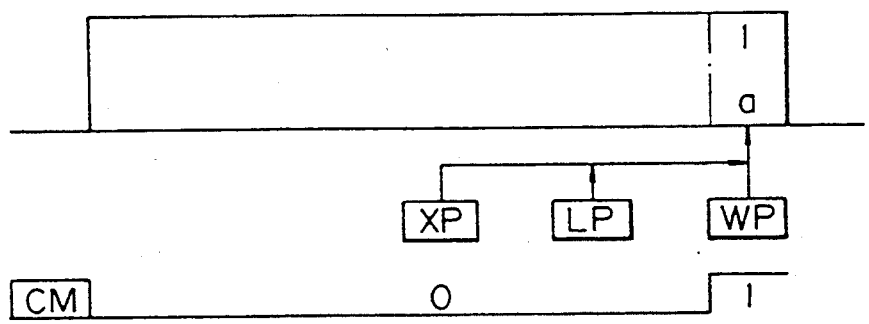

In FIG. 13B, the cell type information VP(WP) is written as VP(WP)=a, and the flag F(WP) is written as F(WP)=1 (steps S20 and S21). Then the last pointer LP(a) and the first pointer XP(a) are both reset to be the same as the write pointer WP (steps S21 and S22). Then, the count value CM(a) is incremented to be 1 (step S19).

Figure 13C:
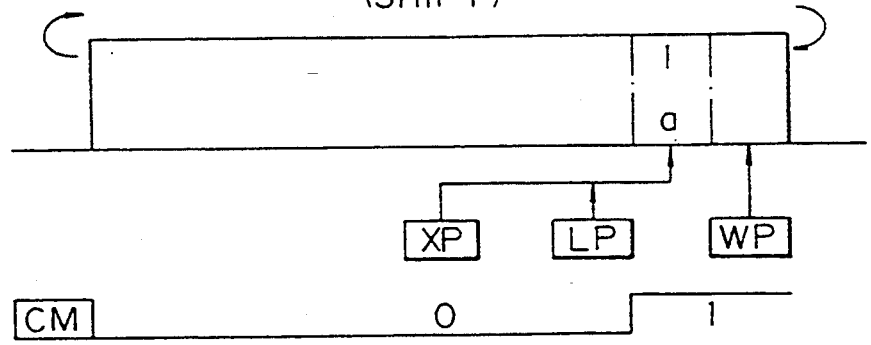

By shifting the contents in the bridge memory BM by one cell, all cells in the BM are shifted in the left-hand direction in the figure by one cell so that the last empty cell at the output of the BM is returned to the input of the BM. This is realized by incrementing the write pointer WP (at step S31) so that the write pointer WP points to the returned cell. Since the returned cell is an empty cell, the flag F(WP) is 0 so that the process returns to the process ①. In this case, the first pointer XP and the the last pointer LP both point to the arriving cell with the information a, and the count value CM=1 is maintained. This state is shown in FIG. 13C.

FIG. 14A shows a state in which a cell with the information a arrives after six empty cells have arrived after the state shown in FIG. 6C. In this case, the count value CM(a) has been maintained to be 1 so that the process proceeds to the step S10 after the judgement at step S5 because CM(a) does not equal to the reference threshold number X(a)=2. At step S10, since the condition CM(a)=0 is not satisfied because CM(a) is 1, the process proceeds to the pointer adding process ③. In this case also, the first pointer XP and the the last pointer LP both point to the already arrived cell with the information a.

The next pointer NP of the cell at the last pointer LP(a) must point to the newly arriving cell. Therefore, the next pointer NP(LP(a)), which is the next pointer of the cell at the last pointer LP(a), is updated at step S16 by the write pointer WP of the newly arriving cell. Then, as shown in FIG. 14B, in the cell type information VP of the newly arriving cell, the information a is written and the flag F(WP) of the newly arriving cell is changed to 1 at step S17. Then, the last pointer LP(a) is updated to point to the newly arriving cell to which the write pointer WP points. The first pointer XP(a) is not changed to point to the previously arrived cell. Then, the count value CM(a) is incremented to be 2. This state is shown in FIG. 14B.

By shifting the contents in the bridge memory BM by one cell, all cells in the BM are shifted in the left-hand direction in the figure by one cell so that the last empty cell at the output of the BM is returned to the input of the BM. This is realized by incrementing the write pointer WP (at step S31) so that the write pointer WP points to the returned cell. Since the returned cell is an empty cell, the flag F(WP) is 0 so that the process returns to the process ①. In this case, the first pointer XP still points to the already arrived cell but the last pointer LP points to the newly arriving cell with the information a, and the count value CM=2 is maintained. This state is shown in FIG. 14C.

Figure 15A:
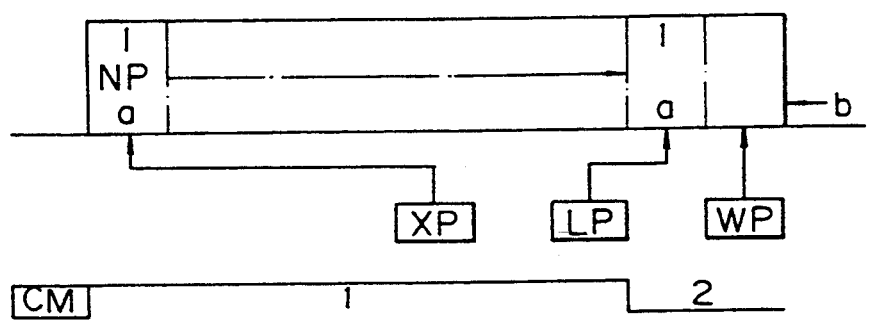
FIGS. 15A to 15C are diagrams explaining still another part of the operation of the UPC circuit shown in FIG. 9A.

FIG. 15A shows a state in which another cell with cell type information b arrives after the state shown in FIG. 14C. In this case, the judgement for a cell with the information a is not effected but only the judgement for a cell with the information b is effected.

Figure 15B:
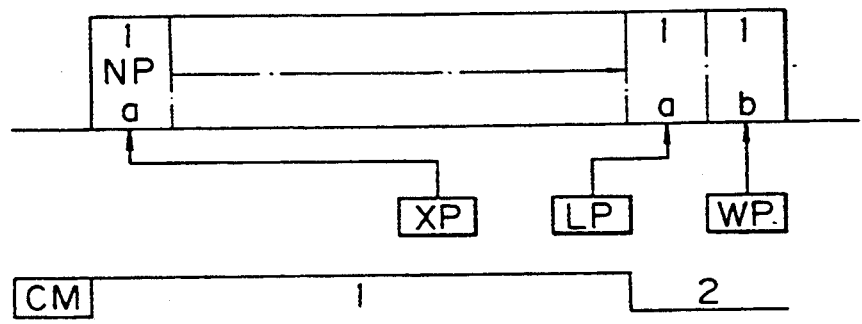
Figure 15C:
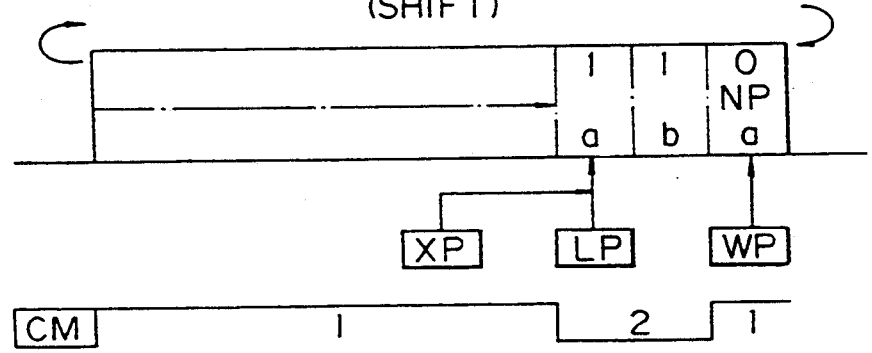

In FIG. 15B, the pointers for the cells with the information a are not changed, but the pointers for the arriving cell with the information b are formed in accordance with the steps S20 to S22. The counter value CM(a) for the cells with the information a is maintained to be 2.

By shifting the state shown in FIG. 15B by one cell, all cells in the BM are shifted in the left-hand direction in the figure by one cell so that the last cell at the output of the BM is returned to the input of the BM. This is realized by incrementing the write pointer WP (at step S31) so that the write pointer WP points the returned cell. Since the returned cell in this example is the cell with the information a and with the flag F=1 representing that the cell is effective, the process after the judgement at step S32 proceeds to the step S33. In the steps S33 to S35, the pointers for the returned cell are deleted. Namely, the count value CM(a) is decremented at step S33 because one cell with the information (a) is output from the BM so that the number of cells between the last pointer and the output of the BM is decreased by one. Then, the next pointer NP(a) at the write pointer WP becomes the first pointer XP(a) at step S34. Then, at step S35, the flag F(WP) is reset to 0 representing that the returned cell is invalid. Thus, the management of the storing area in the BM can be carried out by simply changing the flag F to be 1 or 0 so that the control is easy.

Figure 16A:
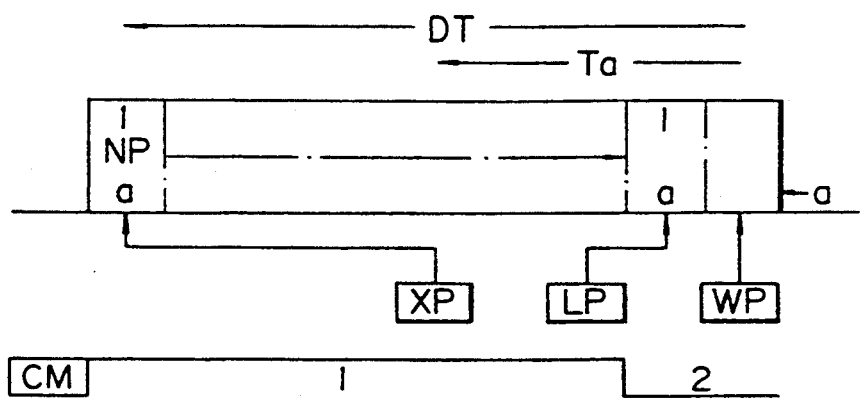
FIGS. 16A to 16C are diagrams explaining still another part of the operation of the UPC circuit shown in FIG. 9A.

FIG. 16A shows a state in which another cell with cell type information a arrives after the state shown in FIG. 14C. In this case, at step S5, since CM(a)=2 and X(a)=2, the process proceeds to step S6 to judge whether or not the arriving cell is in violation by using the measured time interval DT. The time interval DT in this case is 8 cell units. Since the reference threshold time period T(a) in this example is 4 cell units, the condition $DT \geq T$ is satisfied so that the arriving cell with the information a is not in violation, and the process proceeds to the pointer rewrite process ②.

Figure 16B:
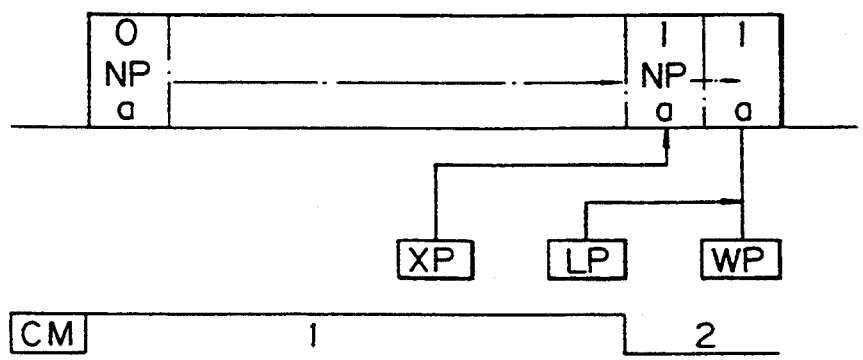

In the pointer rewrite process ②, the write pointer is written in the next pointer NP of the cell pointed to by the last pointer LP at step S11, and a flag F=1 and cell type information VP=a are written, at step S12, in the flag area and the cell type information area for the arriving cell pointed to by the write pointer WP. Thus, the arriving cell is input into the bridge memory BM. Then, the last pointer LP is made to point to the arriving cell pointed to by the write pointer WP at step S13. Further, the flag F of the cell pointed to by the first pointer XP(a) is reset to 0 so that the cell pointed to by the first pointer XP(a) is made invalid. Then, the first pointer XP(a) is changed to point to the next pointer of the first pointer X(a) before changing. Namely, in the illustrated example, the first pointer XP(a) is changed to point to the cell pointed to by the last pointer LP before the pointer adding process. The rewritten pointers are shown in FIG. 16B. The count value CM(a) is not changed in this case.

By shifting the state shown in FIG. 16B by one cell, all cells in the BM are shifted in the left-hand direction in the figure by one cell so that the last cell at the output of the BM is returned to the input of the BM. This is realized by incrementing the write pointer WP (at step S31) so that the write pointer WP points the returned cell. Since the returned cell in this example is the cell with the flag F=0 representing that the cell is invalid, the process after the judgement at step S32 returns to the process ①.

Figure 16C:
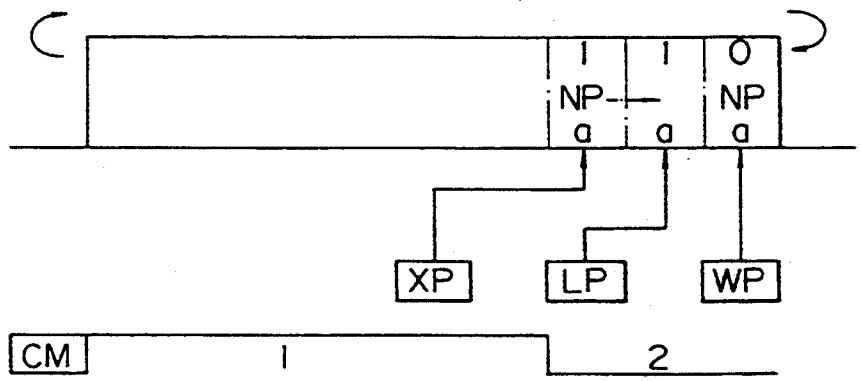
Figure 17A:
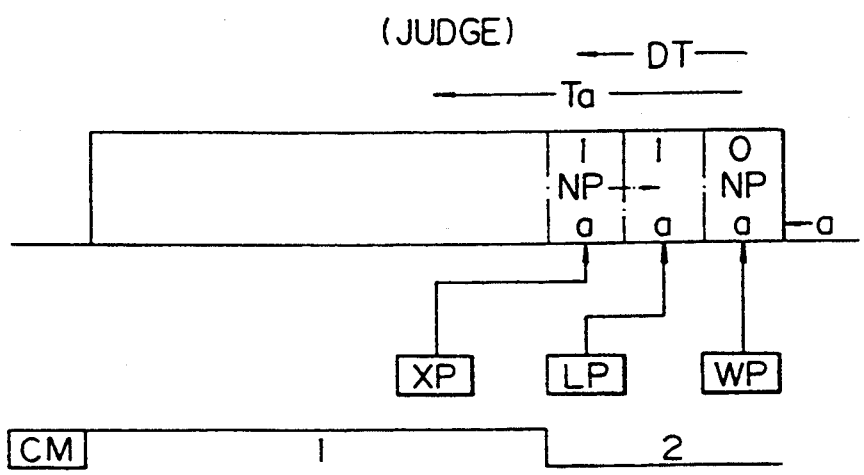
FIGS. 17A to 17C are diagrams explaining still another part of the operation of the UPC circuit shown in FIG. 9A.

FIG. 17A shows a state in which another cell with cell type information a arrives after the state shown in FIG. 16C. In this case, at step S5, since CM(a)=2 and X(a)=2, the process proceeds to step S6 to judge whether or not the arriving cell is in violation by using the measured time interval DT. The time interval DT in this case is 3 cell units. Since the reference threshold time period T(a) in this example is 4 cell units, the condition $DT \geq T$ is not satisfied so that the arriving cell with the information a is in violation, and the process proceeds to step S8 so that the flag F of the arriving cell pointed to by the write pointer WP is changed to 0. Then, at step S9, the arriving cell is discarded. Since the arriving cell is discarded, the pointers XP, LP, and WP are not changed. This state is shown in FIG. 17B.

Figure 17B:
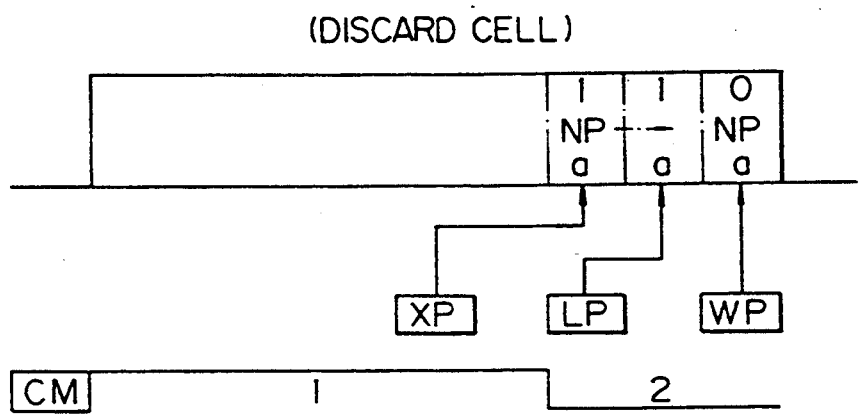
Figure 17C:
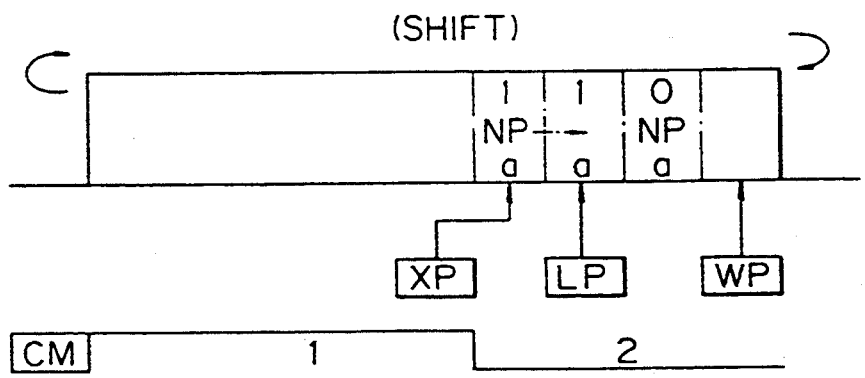

By shifting the state shown in FIG. 17B by one cell, all cells in the BM are shifted in the left-hand direction as shown in FIG. 17C.

In the above described second embodiment of the present invention, it is assumed that the length of the bridge memory (BM) 94 is ($T_{max}+1$), however, the length of the bridge memory (BM) 94 may be $T_{max}$ when another appropriate buffer means is employed. When a RAM is employed as the bridge memory, and when the RAM has a storing capacity of $2^n$, the time interval $T_{max}$ is desired to be ($2^n-1$). When the time interval $T_{max}$ is different from ($2^n-1$), however, a bridge memory having a storing capacity of $2^k$ (where k is a natural number) which is larger than $T_{max}$ may be used.

As will be apparent from the above description, the UPC circuit according to the second embodiment of the present invention can provide a policing control for all kinds of cells with arbitrary combinations of the reference threshold time interval T and the reference threshold number of cells even though the UPC circuit has a small-sized hardware construction. In addition, the UPC circuit of this embodiment has an architecture with superior expandability and flexibility so that the policing control can be easily adapted to a system without influencing the number of accessing times, i.e., the processing speed, even when the parameters $T_{max}$, X, or the number of cell types is changed depending on the system. Further, it is not necessary to measure the absolute arrival time of a cell as is done in the conventional CAT-M method, so that the hardware construction is greatly down-sized.

When a hardware error is generated in the UPC circuit of the second embodiment, it is necessary to detect the error at an early stage and to rapidly recover to the normal state. In the above second embodiment, the count value of the counter memory CM must be within the range from 0 to X as long as the circuit is normal. Accordingly, when the count value is negative or larger than the reference threshold number X, it is determined that a hard error is generated. In the above-described second embodiment also, when the bridge memory (BM) 94 is accessed by the first pointer XP(a) or the last pointer LP(a), the cell type information a must be stored in the storing area VP of the accessed position. Therefore, if the cell type information a cannot be read from the accessed position, it is also determined that a hardware error is generated.

When a hardware error is detected, preferably all counter memories CM are reset, and at least the flags F in the bridge memory (BM)94 are made invalid, whereby the policing control for the cells of all cell types can be started again from the pointer forming process ④ so that the UPC circuit can be rapidly recovered to the normal state.

When a hardware error is generated, it may also be happen that the count value of the counter memory CM becomes different from the number of valid cells with the flags F=1 in the bridge memory (BM) 94. It is difficult, however, to actually detect this state. If this state is left as it is, the erroneous policing control disadvantageously continues. Therefore, taking this case into consideration, all of the counter memories CM are periodically reset, and at least the flag storing areas F in the bridge memory (BM) 94 are made invalid. Thus, the policing controls for the cells of all cell types can be periodically started again from the pointer forming process ④ so that the UPC circuit can be maintained at the normal state.

Figure 18A:
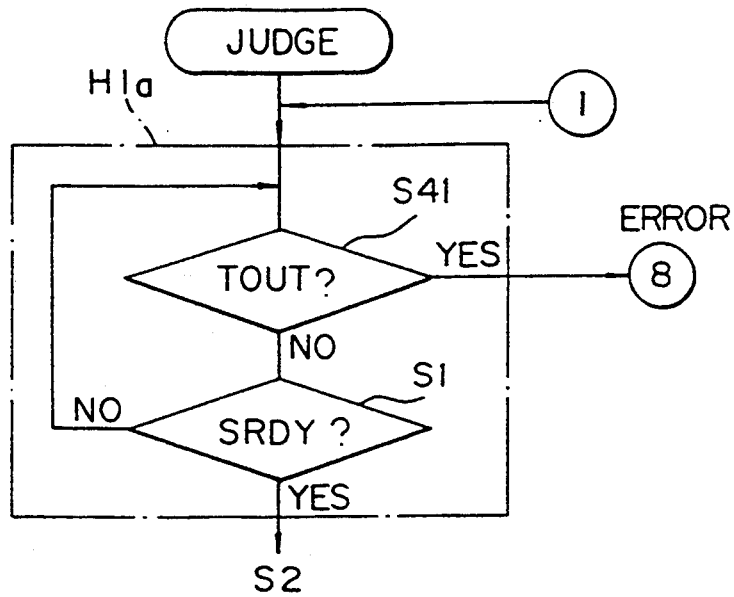
FIGS. 18A and 18B are flowcharts explaining a modification of the judgement process in the UPC circuit shown in FIG. 9A.

FIG. 18A to FIG. 20 are flowcharts explaining the policing control in which the hardware error is taken into consideration in the UPC circuit of the second embodiment. Namely, FIGS. 18A and 18B are flowcharts explaining another judgement process of the second embodiment; FIGS. 19A and 19B are flowcharts explaining another pointer process of the second embodiment; and FIG. 20 is a flowchart explaining the error process of the second embodiment.

Figure 18B:
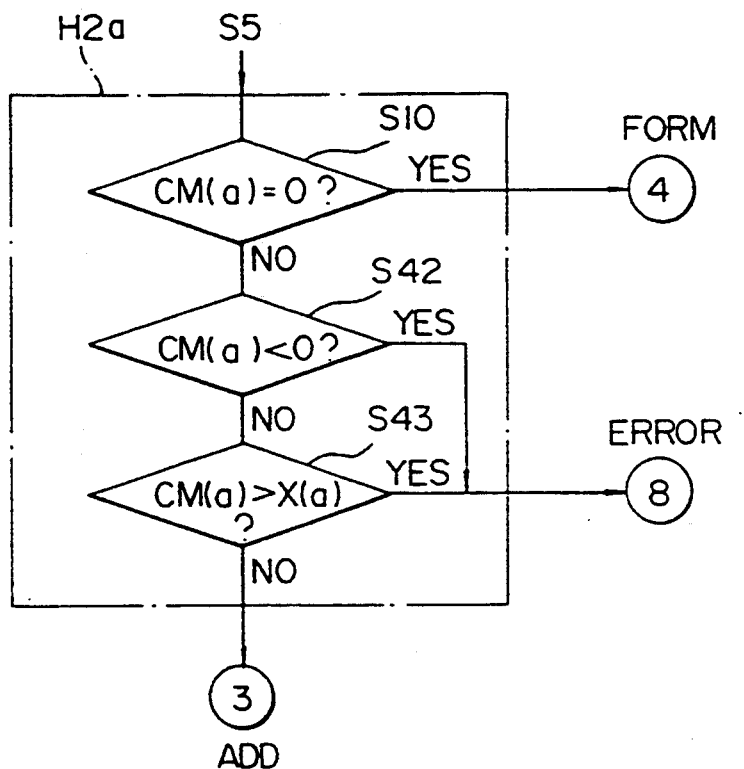

In FIG. 18A, H1a is a modification of the process H1 in FIG. 10. In FIG. 18B, H2a is a modification of the process H2 in FIG. 10. In FIG. 18A, a step S41 is added before the process at step S1. At the step S41, it is judged whether or not a predetermined period of time, or a time out (TOUT) has passed by means of a not shown timer. If the time out has not occured, the process proceeds to step S1. If the time out occurs, the process proceeds to the error process ⑧. Thus, the error process ⑧ which is described later in more detail is forced to be periodically executed.

In FIG. 18B, steps S42 and S43 are added after the answer NO in the decision at step S10. Thus, when CM(a)=0 is not satisfied as step S10, it is judged at step S42 whether or not CM(a)<0 is satisfied. If CM(a)<0 is satisfied, the process proceeds to the error process ⑧; and if CM(a)<0 is not satisfied, it is judged at step S43 whether or not CM(a)>X (a) is satisfied. If CM(a)>X(a) is satisfied, the process proceeds to the error process ⑧; and if CM(a)>X(a) is not satisfied, the process proceeds to the pointer adding process ④ shown in FIG. 11.

Figure 19A:
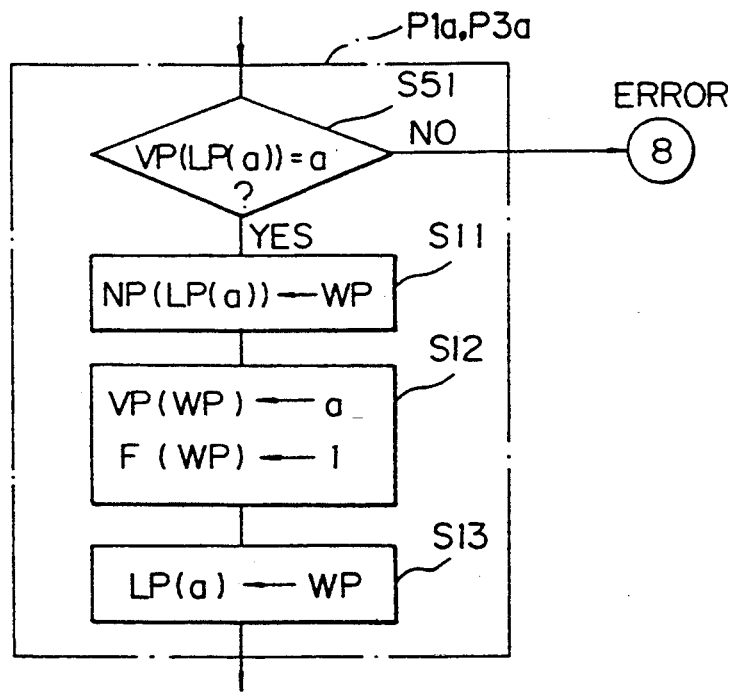
FIGS. 19A and 19B are flowcharts explaining a modification of the pointer process in the UPC circuit shown in FIG. 9A.
Figure 19B:
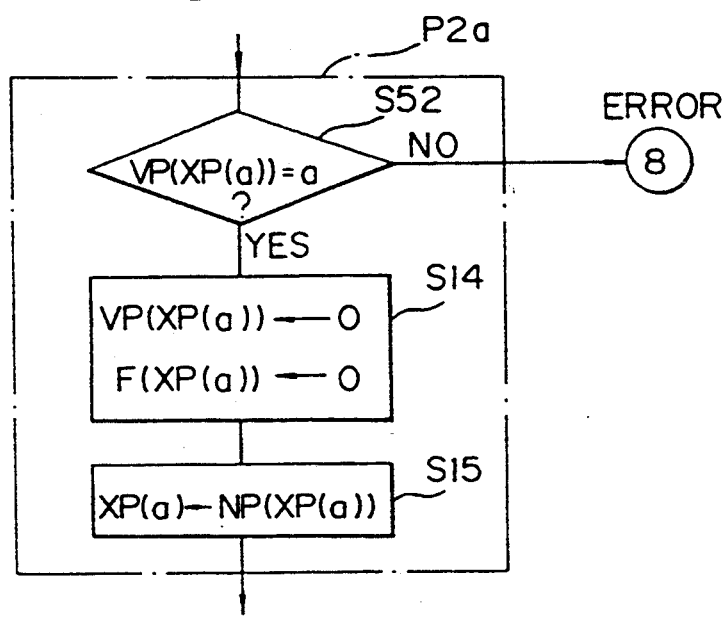

In FIG. 19A, P1a or P3a is a modification of the process P1 or P3 in FIG. 11. In FIG. 19B, P2a is a modification of the process P2 in FIG. 11.

In FIG. 19A, a step S51 is added before the process at step S11 in the process P1 shown in FIG. 11. In the step S51, it is judged whether or not the content of the cell type area indicated by the last pointer LP(a) 9 is a. When it is not the cell type a, the process proceeds to the error process ⑧; and when it is the cell type a, the process proceeds to step S11. With respect to the process P3a, a discussion similar to the above can be applied except that the steps S11 to S13 are replaced by steps S16 to S18 in FIG. 11.

In FIG. 19B, a decision step S52 is added before the process at step S14 in the process P2 shown in FIG. 11. In the step S52, it is judged whether or not the content of the cell type area VP indicated by the first pointer XP(a) is the cell type a. If it is not the cell type a, the process proceeds to the error process ⑧; and if it is the cell type a, the process proceeds to the step S14.

FIG. 20 is a flowchart explaining the error process in the second embodiment. The error process includes a process E1 for resetting all of the counter memories CM and a process E2 for invalidating all of the flags F. In the process E1, at step S61, a certain number m is set in the register RVP; at step S62, 0 is written into the counter memory CM (RVP) indicated by the register RVP. At step S63, the number in the register RVP is decremented. At step S64, it is judged whether or not RVP=0 is satisfied. If it is not satisfied, the process returns to step S62; and if RVP=0 is satisfied, the reset of all of the counter memories CM is finished.

Then, in the process E2, at step S65, the length L of the bridge memory BM is set in the write pointer WP. At step S66, 0 is written into the flag (WP) indicated by the write pointer WP. At step S68, it is judged whether or not WP=0 is satisfied. If WP=0 is not satisfied, the process returns to the step S66; and if WP=0 is satisfied, all of the flags F are made invalid so that the process returns to the judgement process ① in FIG. 10.

In this way, when the error process ⑧ is being executed, no arriving cell is processed; and after the end of the error process ⑧, all counter memories CM are reset to 0 and all flags are changed to 0 so that the pointer forming process ④ in FIG. 11 is carried out for all cell types to form the pointers again.

Figure 21:
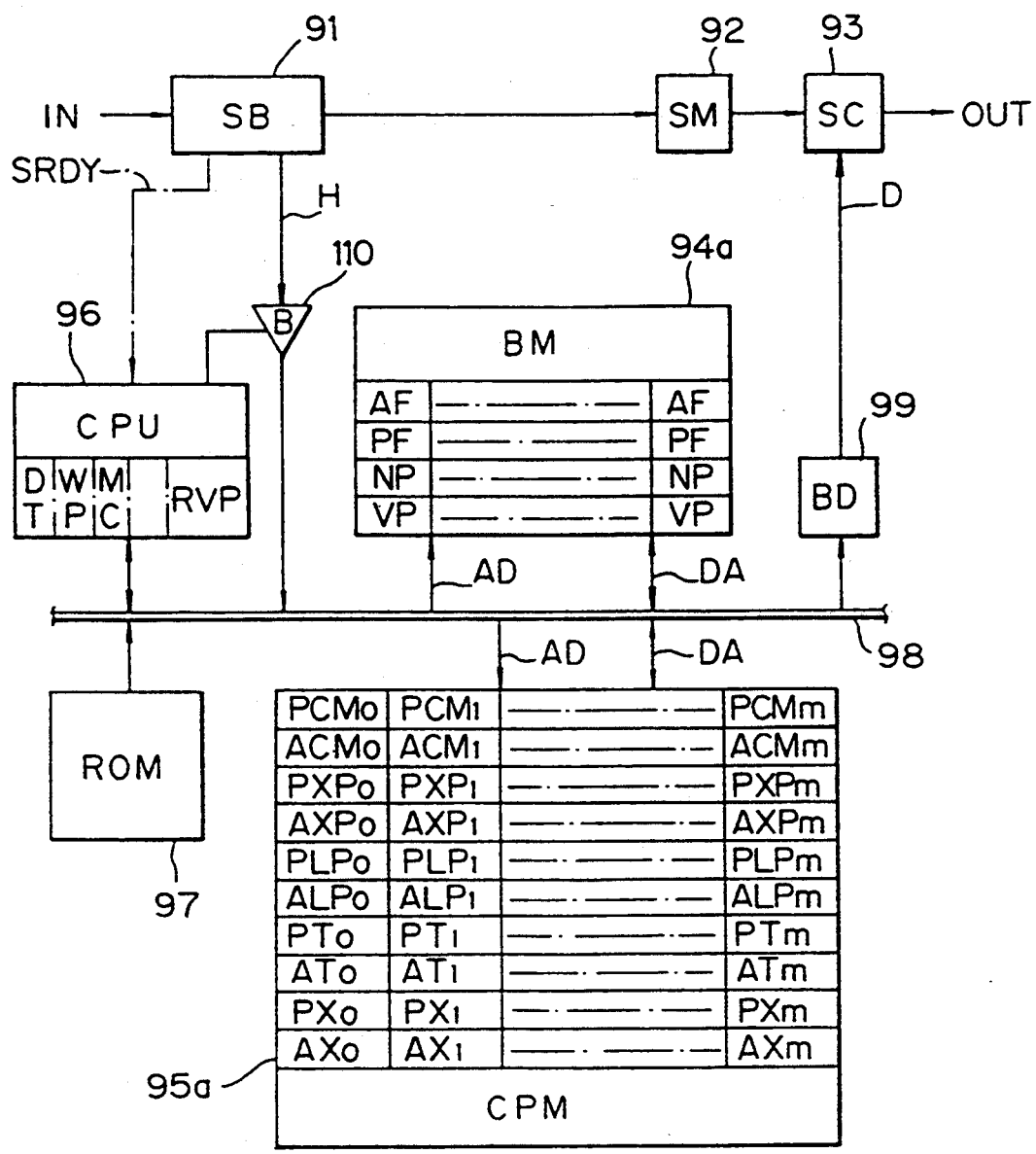
FIG. 21 is a block diagram of an UPC circuit according to the third embodiment of the present invention.

FIG. 21 is a block diagram of a UPC circuit according to a third embodiment of the present invention. In the third embodiment, a plurality of kinds of flag storing areas are employed so that a policing judgement based on an average value of declared parameters and a policing judgement based on a peak value of declared parameters are executed in parallel for the cells to be judged.

In the figure, 94a is a bridge memory (BM) including plural kinds of flag storing areas AF and PF; 95a is a control and parameter memory (CPM) for holding control information and parameter information for effecting plural kinds of policing controls for the cells to be judged.

In the bridge memory (BM) 94a, AF represents a flag storing area of a flag to be used in the control system of the average value of the traffic, and PF represents a flag storing area of a flag to be used in the control system of the peak value of the traffic. In the control and parameter memory (CPM) 95a, $ACM_0$ to $ACM_m$ represent counter memories used in the control system of the average value of the traffic; and $PCM_0$ to $PCM_m$ represent counter memories used in the control system of the peak value of the traffic. With respect to the other pointers, similar definitions to those above apply. In the CPU 96, MC is a mode counter for determining an executing mode of a control program. It is apparent that the counter memories $CM_0$ and $CM_1$ in the UPC circuit shown in FIG. 9A can be respectively used as the counter memories $ACM_0$ and $PCM_0$ in the UPC circuit shown in FIG. 21.

Figure 22:
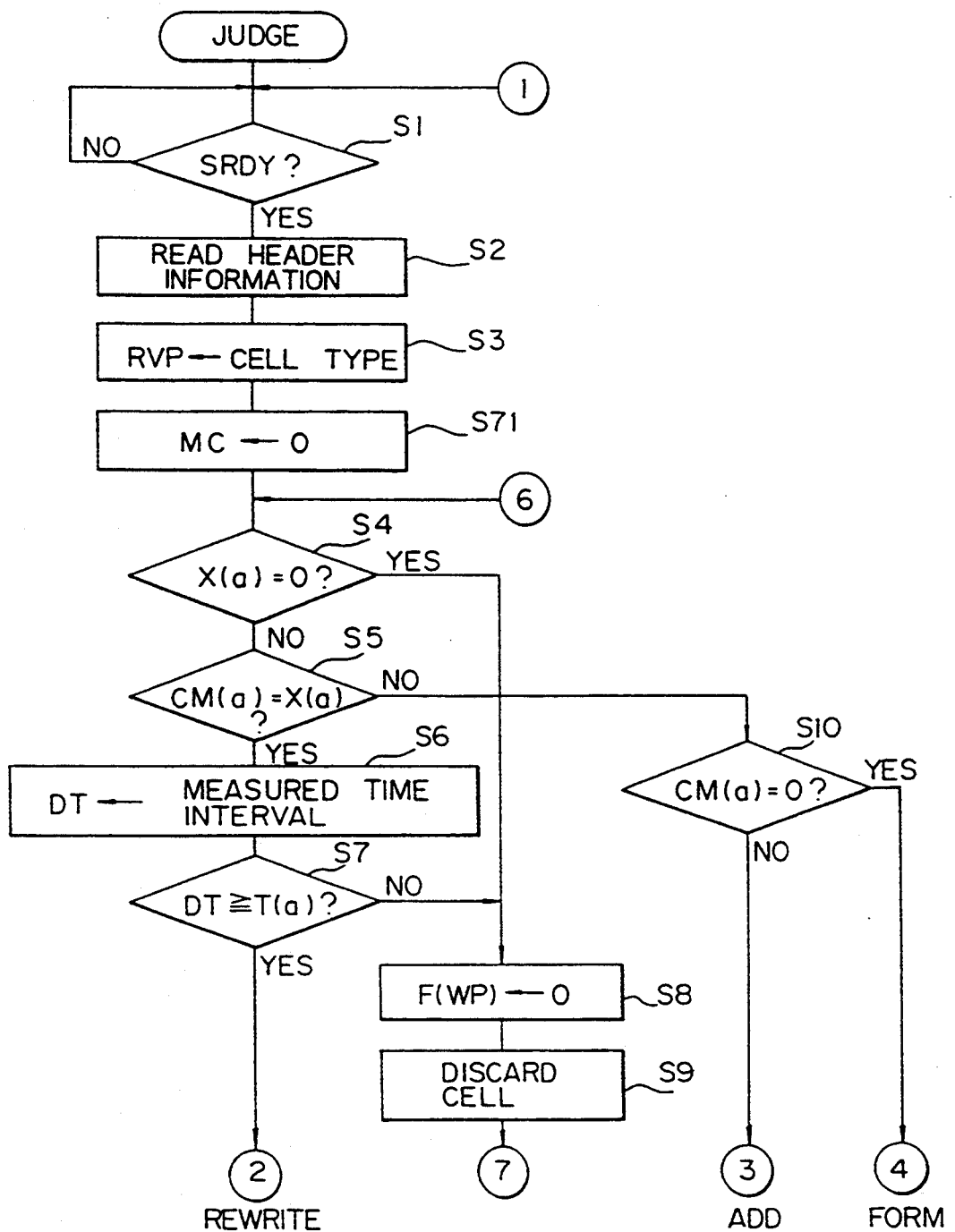
FIG. 22 is a flowchart explaining the judgement process in the UPC circuit shown in FIG. 21.
Figure 23:
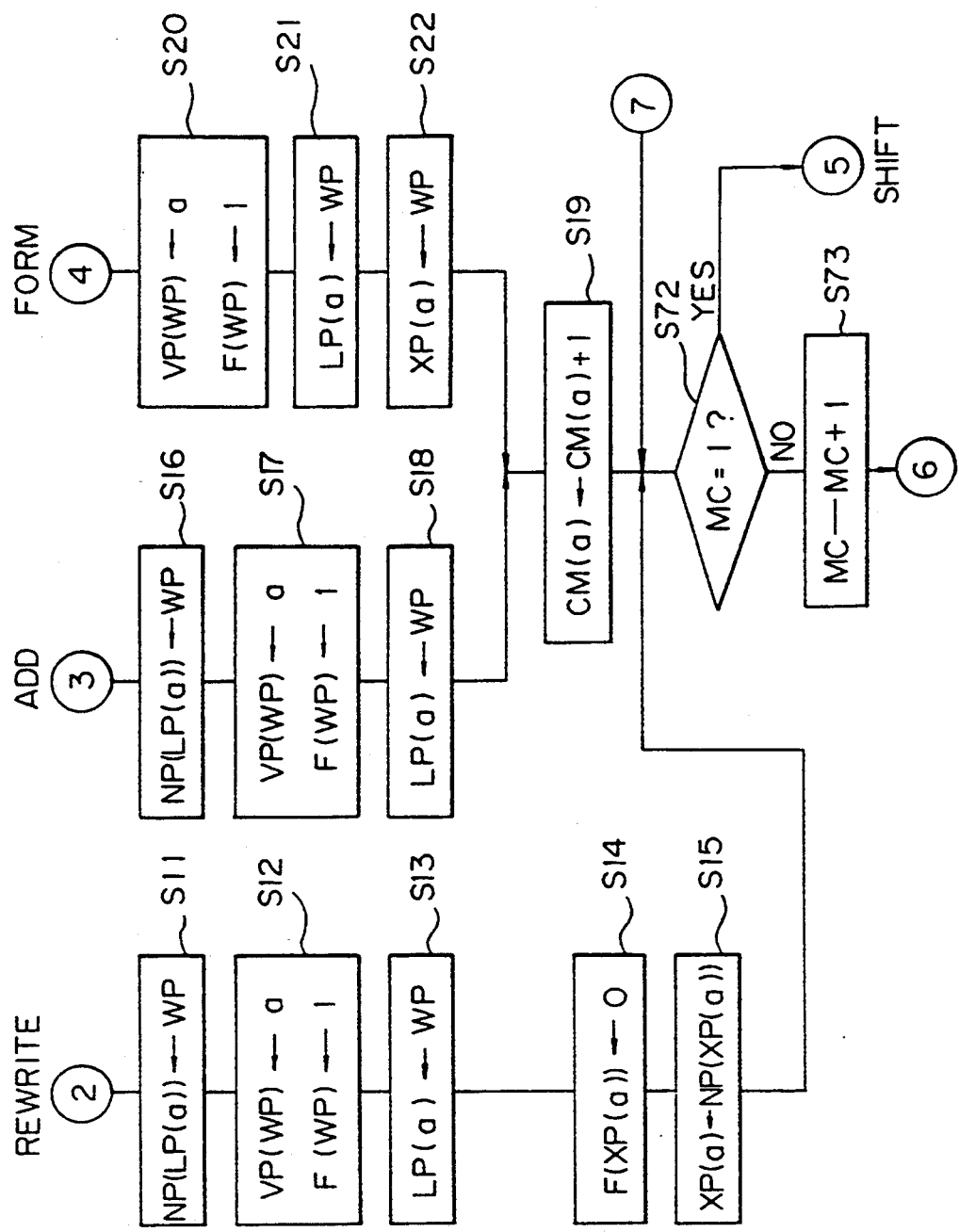
FIG. 23 is a flowchart explaining the pointer process in the UPC circuit shown in FIG. 21.
Figure 24:
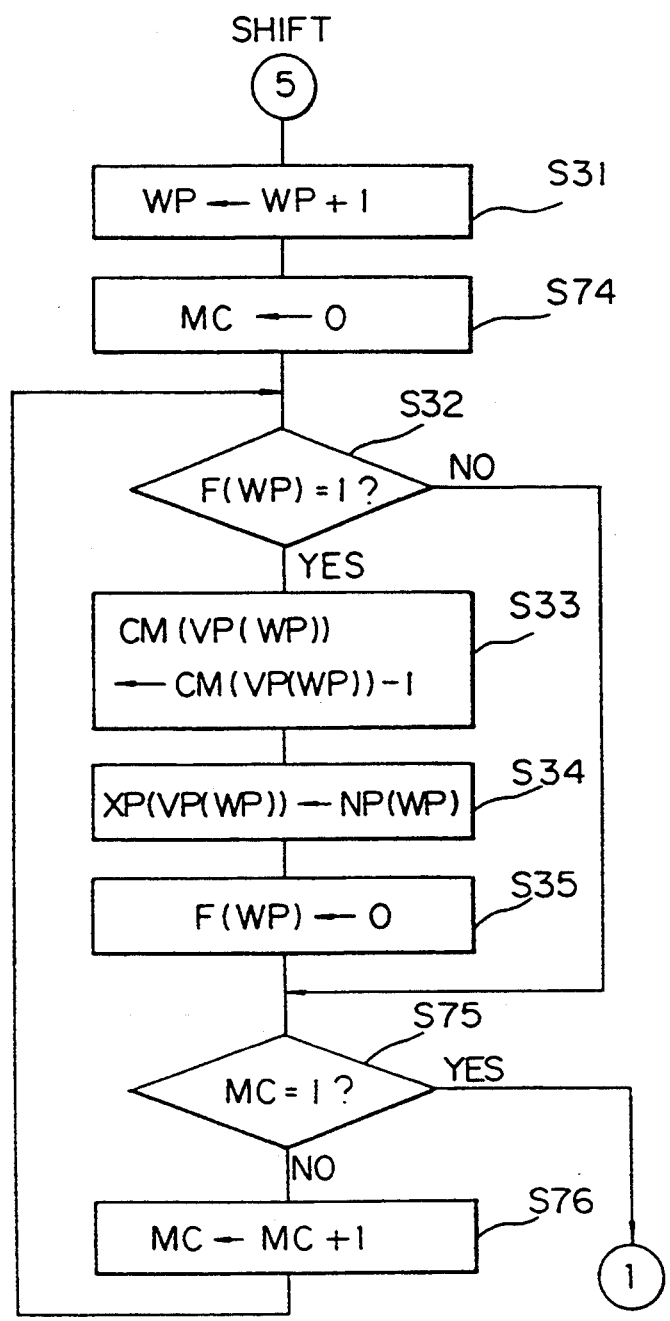
FIG. 24 is a flowchart explaining the shift process in the UPC circuit shown in FIG. 21.

FIGS. 22 to 24 are flowcharts explaining the policing control according to the third embodiment of the present invention. FIG. 22 is a flowchart explaining a policing judgement process, FIG. 23 is a flowchart explaining a pointer process for pointing the bridge memory, and FIG. 24 is a flowchart explaining a shift process of the bridge memory. Note that the same steps as those in FIGS. 10 to 12 are denoted by the same reference symbols and the descriptions thereof are omitted here.

In the third embodiment of the present invention, a process from the node ⑥ in FIG. 22 to the node ⑦ in FIG. 23 is repeated for both the peak value control with MC=0 and the average value control with MC=1, and then a step S31 in FIG. 24 to increment the write pointer WP is executed one time, and then a process from step S31 to step S35 is repeated for both the peak value control with MC=0 and the average value control with MC=1.

In FIG. 22, at step S71, 0 is set in the mode counter MC. Then the process on and after step S4 is executed. In FIG. 23, at step S72, it is judged whether MC=1 is satisfied. If MC=1 is not satisfied, the mode counter MC is incremented at step S73, and the process returns to the node ⑥. In FIG. 24, the write pointer WP is incremented at step AAS31. At step S74, the mode counter MC is reset to 0, and the process on and after step S32 is executed. Then, at step S75, it is judged whether or not MC=1 is satisfied. If MC=1 is not satisfied, the mode counter MC is incremented at step S76, and the process returns to step S32. If MC=1 is satisfied, the process returns to the judgement process ① in FIG. 22.

In the UPC circuit of the third embodiment, the policing control in which the countermeasure for the hardware error is taken into consideration. Those shown in FIG. 18A to FIG. 20, may be employed.

FIG. 25A to FIG. 27C are diagrams for explaining the operation of the UPC circuit according to the third embodiment of the present invention. Here, it is assumed that a cell with the cell type a is the cell to be judged; the reference threshold time interval PT for the peak value control is 3; the reference threshold number of cells PX is 2; the reference threshold time interval AT for the average value control is 6; and the reference threshold number AX of cells for the average value control is 3.

Figure 25A:
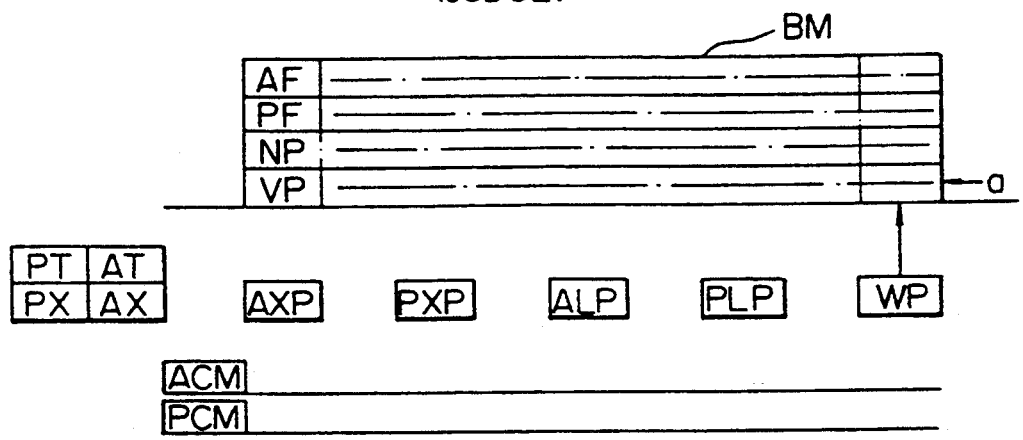
FIGS. 25A to 25C are diagrams explaining a part of the operation of the UPC circuit shown in FIG. 21.

In FIG. 25A, in the bridge memory (BM)94a, there is no cell type a, and the first cell type a arrives at the input of the bridge memory (BM) 94a.

In the peak value control with MC=0, the condition PCM=PX (=2 in this example) is not satisfied at step S5, and PCM=0 is satisfied at step S10. Therefore, the process proceeds to the pointer forming process ④.

Figure 25B:
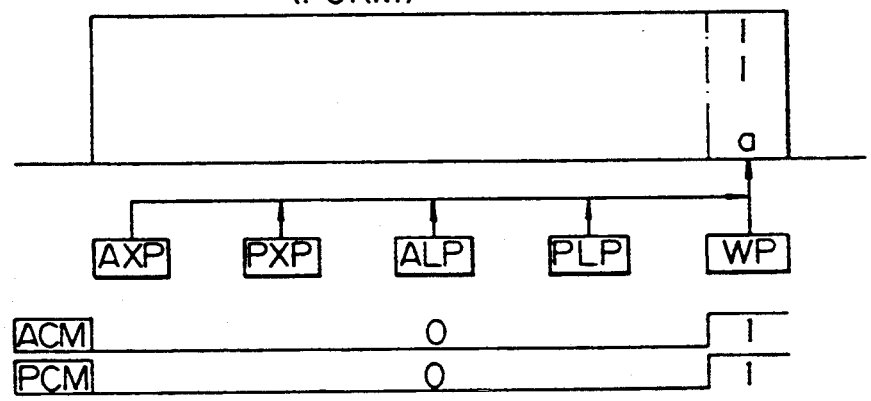

In FIG. 25B, PF=1 and VP=a are written in the flag information area and the cell type information area indicated by the write pointer WP. The PXP and PLP are made to be the same as the write pointer WP. Then the PCM is incremented to 1.

In the average value control with MC=1, the condition ACM=AX (=3 in this example) is not satisfied at step S5, and ACM=0 is satisfied at step S10. Therefore, the process proceeds to the pointer forming process ④.

In FIG. 25B, AF=1 and VP=a are respectively written in the flag information area and the cell type information area indicated by the write pointer WP. The AXP and ALP are made to be the same as the write pointer WP. Then the ACM is incremented to 1.

Figure 25C:
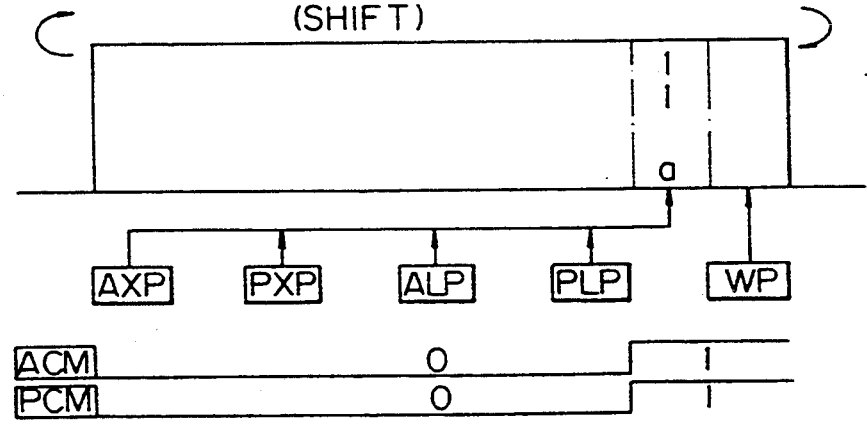

By shifting the state shown in FIG. 25B, the state is changed to the state shown in FIG. 25C.

Figure 26A:
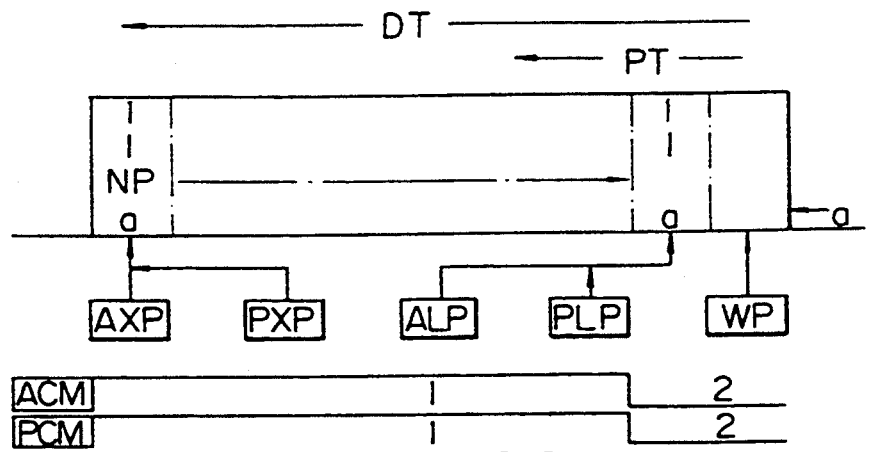
FIGS. 26A to 26C are diagrams explaining another part of the operation of the UPC circuit shown in FIG. 21.

In FIG. 26A, a second cell type a is stored after seven cells without the cell type information a that arrived after the state shown in FIG. 25C, and a third cell type a arrives at the input of the bridge memory (BM). It is assumed that at this timing, the policing control for the average value is being executed.

Figure 26B:
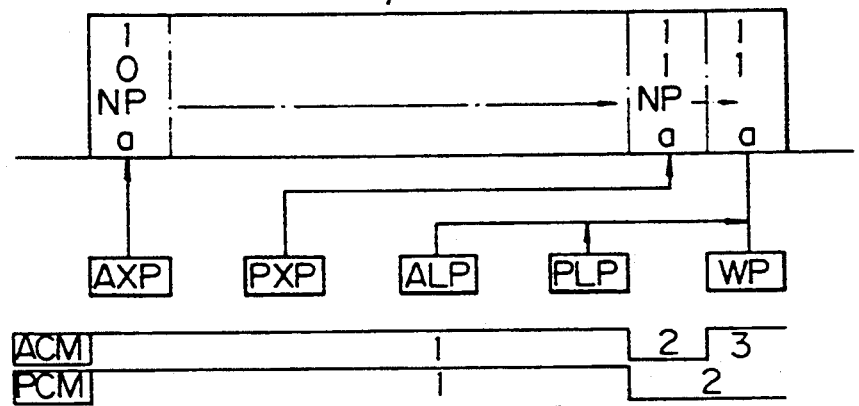

In the peak value control with MC=0, PCM=PX (=2 in this example) is satisfied at step S5 so that the process proceeds to the judgement by using the measured time interval DT. Since DT≧PT (8≧3) is satisfied, the arriving cell with the cell type information a is judged not to be in violation. At this timing, since the policing control for the average value is being executed as assumed above, only the information in the bridge memory (BM) 94a and the related pointers are updated. In this case, the process proceeds to the pointer rewrite process ②. In FIG. 26B, the content of the write pointer WP is written into the next pointer indicated by the last pointer PLP, and PF=1 and VP=a are written in the storing area indicated by the write pointer WP. Then, the last pointer PLP is updated to indicate the write pointer WP. Further, the flag PF indicated by the first pointer PXP is changed to 0. Then, the PXP is updated to indicate the content of its next pointer NP, namely the position which has been indicated by the PLP before the pointer add process. The counter memory PCM is not changed.

Next, in the average value control with MC=1, the condition ACM=AX (=3 in this example) is not satisfied at step S5 so that the arriving cell with the cell type information a is judged not to be in violation. Therefore, the arriving cell is not actually discarded. Since ACM=2 is satisfied, the process proceeds to the pointer adding process ③. In FIG. 26B, the content of the write pointer WP is written into the next pointer NP indicated by the last pointer ALP in the bridge memory (BM) 94a, and AF=1 and VP=a are written in the storing area indicated by the write pointer WP in the bridge memory (BM) 94a. The first pointer AXP is not changed but the last pointer ALP is updated to indicate the position indicated by the write pointer WP. The counter memory ACM is incremented to 3.

Figure 26C:
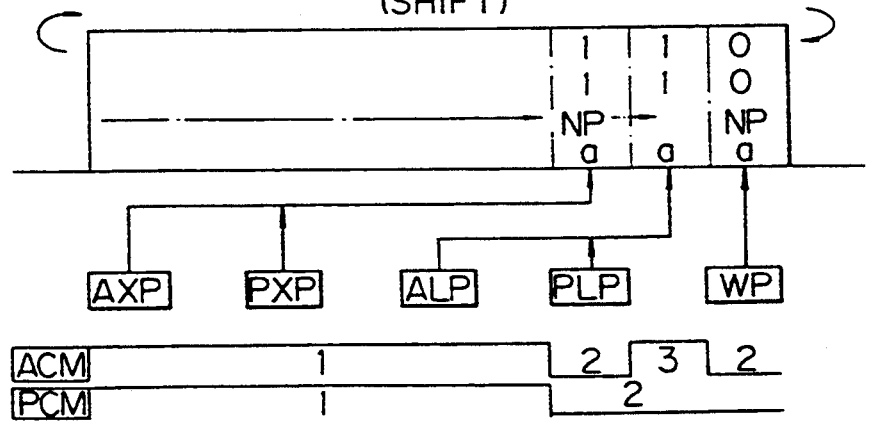

By shifting the state shown in FIG. 26b, a state shown in FIG. 26C is realized. Namely, in the peak value control with MC=0, the storing position of the cell type a of the first cell is returned to the input of the bridge memory (BM) 94a by this shift, but since the flag PF of the first cell has been reset to 0, no action is effected. In the average value control with MC=1, since the storing position of the cell type a of the first cell the flag of which has been 1 is returned to the input of the bridge memory (BM) 94a, the counter memory ACM is decremented, and the content of the next pointer indicated by the first pointer AXP is loaded into the first pointer AXP. Then the flag AF indicated by the write pointer WP is forced to be 0.

FIG. 27A shows a state in which a fourth cell with the cell type a arrives after the state shown in FIG. 26C. At this timing, it is assumed that the policing control is being carried out.

In the peak value control with MC=0, since PCM=PS (=2 in this example) is satisfied at step S5, the process proceeds to the judgement process by using the measured time interval DT. In the judgement using the DT, since DT≧PT (2≧3) is not satisfied, the arriving cell with the cell type a is judged to be in violation. Therefore, the arriving cell a is discarded. In FIG. 27B, since the arriving cell a has been discarded, no information is written in the bridge memory (BM) 94a, and no process is effected on the pointers.

In the average value control with MC=1, since ACM=AX (=3) is not satisfied at step S5, and since ACM=2 is satisfied at step S10, the process proceeds to the pointer adding process ③. In FIG. 27B, the content of the write pointer WP is written in the next pointer NP indicated by the last pointer ALP in the bridge memory (BM) 94a; and AF=1 and VP=a are written the the storing area indicated by the write pointer WP in the bridge memory (BM) 94a. The first pointer AXP is not changed but the last pointer ALP is updated to indicate the position indicated by the write pointer WP. Then the counter memory ACM is incremented to 3. By shifting this state, a state shown in FIG. 27C is realized.

Thus, by using the plurality of kinds of the flag storing areas AF and PF, a plurality of kinds of policing controls can be carried out on the cells with a desired cell type a for example. According to the above-described third embodiment, the control system using the average value and the control system using the peak value both carry out traffic supervision and traffic managements in accordance with their own set parameters respectively. Therefore, even if a switching control is executed in such a way that the policing control in accordance with the peak value is executed at first and then the policing control in accordance with the average value is executed, or vice versa, the latter policing judgement reflects the result of the supervision in the former policing control.

It should be noted that the policing control in accordance with the peak value and the policing control in accordance with the average value may be executed simultaneously. In this case, in the above example, in the control according to the average value, up to three cells are allowed to pass within the reference threshold time interval AT=6, while, in the control according to the peak value simultaneously executed with the control according to the average value, the continuous three cells are not allowed to pass within the reference threshold time interval PT=3.

In the above-described third embodiment of the present invention, with respect to the cell with the cell type information a which was actually discarded in the peak value control, the cell is judged not to be in violation in the average value control and the cell type information a is stored in the bridge memory (BM) 94a. The present invention, however, is not restricted to this. For example, with respect to the cell with the cell type information a which was actually discarded in the peak value control, the cell may be forcedly treated as a violating cell or it may be assumed that the cell with the information a has not arrived. A similar discussion can be applied with respect to the cell which was actually discarded in the peak value control. In these cases, it is not necessary to provide a plurality of last pointers such as the PLP and ALP, but a single last pointer common to the average value control and the peak value control.

In the above embodiments, all of the counter memories CM are reset when a hardware error is detected or periodically, and at least the flag storing areas F are made invalid, however, the present invention is not restricted to this. For example, there is a case in which it is possible to recover the UPC circuit from an abnormal state by resetting the counter memories CM corresponding to a particular cell type, and by making the flag storing areas F corresponding to the cell types.

In the above described embodiment, with respect to a cell having a predetermined cell type, the policing judgement according to the average value declaration and the policing judgement according to the peak value declaration are described. The present invention, however, is not restricted to these. There may be three or more kinds of flags, and these flags may be freely used for any control system having any object.

In the above embodiments, the control unit CTL shown in FIG. 8A or the CPU 96 is operated by software, however, the control unit CTL or the CPU 96 and the ROM 97 may be formed by hardware.

From the foregoing description, it will be apparent that, according to the present invention, the memory accessing speed can be decreased so that the policing control according to the dangerous bridge method can be realized. In addition, the influence of a software error in a memory can be removed within a limited time. Still further, by providing a bridge memory for storing cell type information of arriving cells in a time sequence, a first pointer holding means for holding the storing positions of the cell type information of the cells to be judged, and a control unit for controlling them to execute a policing judgement, a simple traffic judging unit is realized so that a down-sized UPC circuit having excellent general purpose characteristics and flexible expandability can be provided.

What is claimed is:

1. A usage parameter control circuit for effecting a policing control in an ATM transmission network to restrict transmission of an arriving cell when the arriving cell is in violation of at least one of a number of usage parameters declared by a subscriber, comprising:

time interval measuring means for measuring a time interval between a current arrival time of a cell to be judged as to whether or not the cell is in violation, and an arrival time of a cell which arrived a reference threshold number of cells before the currently arriving cell arrives;

judging means for determining whether or not the measured time interval is shorter than a reference threshold time interval, said reference threshold number of cells and said reference threshold time interval being at least a part of said usage parameters declared by the subscriber, the currently arriving cell being judged to be in violation of the usage parameters when the measured time interval is shorter than the reference threshold time interval;

adjacent cell time interval measuring means for measuring an adjacent cell arrival time interval between adjacent cells each time a cell to be judged arrives;

memory means for storing the adjacent cell arrival time interval between adjacent cells each time a cell to be judged arrives;

and cell discarding means;

wherein the interval measuring means obtains the measured time interval between the current arrival time of a cell to be judged and an arrival time of a cell which arrived a reference threshold number of cells before the currently arriving cell arrives by adding the reference threshold number of the arriving time intervals stored in the memory means;

said judging means determines the violation of a usage parameter, based on the judgement of whether or not the measured time interval is shorter than the reference threshold time interval, and whether or not the number of cells passed within the reference threshold time interval is larger than the reference threshold number of cells; and said cell discarding means discards the currently arriving cell when the judging means determines that the number of cells passed within the reference threshold time interval is larger than the reference threshold number of cells.

2. A usage parameter control circuit as claimed in claim 1, wherein said time interval measuring means comprises a memory for storing the arrival time of the cell which arrived the reference threshold number of cells before the currently arriving cell arrives.

3. A usage parameter control circuit as claimed in claim 2, wherein said memory is comprised of a logical shift register having a random access memory and pointers for indicating the addresses of said random access memory.

4. A usage parameter control circuit as claimed in claim 3, further comprising write inhibit means for inhibiting the writing of the current arrival time into said memory when said cell discarding means discards the currently arriving cell.

5. A usage parameter control circuit as claimed in claim 1, wherein said memory means comprises a logical shift register having a random access memory and pointers for indicating the addresses of said random access memory.

6. A usage parameter control circuit as claimed in claim 5, further comprising write inhibit means for inhibiting the writing of the arrival time interval into said memory when said cell discarding means discards the currently arriving cell.

7. A usage parameter control circuit as claimed in claim 1, wherein the adjacent cell time interval measuring means comprises a timer counter provided to correspond to each cell type information, for counting a time, the count value in the timer counter being input to the memory means each time when a cell arrives at the input of the memory means, and the count value of the timer counter being reset each time the count value is input to the memory means.

8. A usage parameter control circuit as claimed in claim 1, wherein said memory means is provided to correspond to each cell type information.

9. A usage parameter control circuit as claimed in claim 8, wherein at least one reference threshold time interval and said reference threshold number depends on the cell type information.

10. A usage parameter control circuit for effecting a policing control in an ATM transmission network to restrict the transmission of an arriving cell when the arriving cell is in violation of at least one of usage parameters declared by subscribers, comprising:
a plurality of judging units provided to respectively correspond to cell types, each for determining whether or not an arriving cell of a corresponding cell type is in violation of corresponding usage parameters declared by a subscriber;
each of the judging units comprising:
time interval measuring means for measuring a time interval between a current arrival time of a cell to be judged as to whether or not the cell is in violation, and an arrival time of a cell which arrived a reference threshold number of cells before the currently arriving cell arrives; and
judging means for determining whether or not the measured time interval is shorter than a reference threshold time interval, said reference threshold number of cells and said reference threshold time interval being at least a part of said usage parameters declared by the subscriber, the currently arriving cell being judged to be in violation of the usage parameters when the measured time interval is shorter than the predetermined time interval;
wherein said time interval measuring means comprises:
bridge memory means for storing, in a time sequence, at least one cell type of cells arriving at an input of the bridge memory; and
first pointer holding means for holding a first pointer indicating a storing position of a cell type, stored in the bridge memory, or a cell, the stored cell type being the same as the cell type of an arriving cell to be judged; and
said judging means comprises a control unit for determining whether or not an arriving cell to be judged is in violation by controlling the bridge memory and the first pointer holding means;
wherein said control unit comprises comparing means for comparing the time interval determined, each time a cell to be judged arrives at the input of the bridge memory, by a difference between the storing position indicated by said first pointer holding means and the input position of the bridge memory with the reference threshold time interval, whereby the arriving cell is judged to be in violation when the measured time interval is shorter than the reference threshold time interval.

11. A usage parameter control circuit as claimed in claim 10, wherein when the control unit judges that the arriving cell is not in violation, the control unit controls the first pointer holding means to store the position information of the cell type of the arriving cell at the input of the bridge memory.

12. A usage parameter control circuit as claimed in claim 10, further comprising counting means for counting a number of cell types or cells, the cell types being stored in the bridge memory, the cell types of the cells being the same as the cell type of an arriving cell to be judged;
the control unit controlling the counting means to count the number of cell types of the cells up to a certain number n from a cell type at the input of the bridge memory to an already stored cell type.

13. A usage parameter control circuit as claimed in claim 12, wherein when the certain number n is a reference threshold number of cells set by a subscriber.

14. A usage parameters control circuit as claimed in claim 12, wherein the control unit controls the first pointer holding means to store the storing position of the cell type of a cell that arrived the number indicated by the counting means before the arrival of the currently arriving cell, the cell type being the same as the cell type of a currently arriving cell to be judged.

15. A usage parameter control circuit as claimed in claim 14, wherein the bridge memory comprises:
cell type storing areas for storing cell types; and
next pointer storing areas respectively related to the cell type storing areas, each of the next pointer storing areas storing a position of a cell type of a cell which arrived next to the arrival of the cell type stored in the related cell type storing area, the control unit chains together a plurality of the cell type storing areas of cells, having the same cell type as the cell type of a currently arriving cell to be judged, by using the next pointer storing areas.

16. A usage parameter control circuit as claimed in claim 15, further comprising:
last pointer holding means for holding the storing position of a cell type of a cell which is most-recently stored in the bridge memory, the cell type being the same as the cell type of the currently arriving cell to be judged;
the control unit controlling, when an arriving cell is judged not to be in violation, the last pointer holding means so as to store the position information of the input of the bridge memory into the next pointer storing area corresponding to the position stored in the last pointer holding means.

17. A usage parameter control circuit as claimed in claim 16, wherein when the count value of the counting means is n when a cell to be judged arrives, the control unit controls the first pointer holding means to record the information stored in the next pointer storing area indicated by the first pointer holding means in the bridge memory into the first pointer holding means.

18. A usage parameter control circuit as claimed in claim 17, wherein the bridge memory comprises at least one flag storing area corresponding to the cell type storing area, the control unit controlling the storing area in the bridge memory to be valid or invalid by using the flag storing area.

19. A usage parameter control circuit as claimed in claim 18, wherein the control circuit forcedly changes the contents of the flag storing area in a storing position, which is to be shifted, at the next timing, to the input of the bridge memory, to be invalid.

20. A usage parameter control circuit as claimed in claim 18, wherein the control circuit forcedly changes the contents of the flag storing area of a cell to be judged, which arrived before arriving the cell at the position indicated by the first pointer holding means, to be invalid.

21. A usage parameter control circuit as claimed in claim 18, wherein the control circuit uses a plurality of the flag storing areas (F) to perform a plurality of policing judgements.

22. A usage parameter control circuit as claimed in claim 10, wherein the first pointer holding means are provided to respectively correspond to cell types.

23. A usage parameter control circuit as claimed in claim 12, wherein the counting means is provided to respectively correspond to the cell types.

24. A usage parameter control circuit as claimed in claim 16, wherein the last pointer holding means is provided to respectively correspond to the cell types.

25. A usage parameter control circuit as claimed in claim 22, wherein the first pointer holding means is included in a random access memory.

26. A usage parameter control circuit as claimed in claim 23, wherein the counting means is included in a random access memory.

27. A usage parameter control circuit as claimed in claim 24, wherein the last pointer holding means is included in a random access memory.

28. A usage parameter control circuit as claimed in claim 10, wherein the bridge memory is constructed by a random access memory which operates as a first-in first-out memory.

29. A usage parameter control circuit as claimed in claim 10, wherein the bridge memory stores a plurality of kinds of the cell type information.

30. A usage parameter control circuit as claimed in claim 18, wherein the control unit comprises hardware error detecting means for detecting a hardware error by detecting that the count value of the counting means is negative or larger than the number n.

31. A usage parameter control circuit as claimed in claim 18, wherein the control unit comprises hardware error detecting means for detecting a hardware error by detecting that, when the bridge memory is accessed by the first pointer holding means or the last pointer holding means, the control unit acknowledges the cell type of the cell at the accessed storing position.

32. A usage parameter control circuit as claimed in claim 30, wherein when a hardware error is detected, the control unit resets the counting means and makes at least the flag storing areas in the bridge memory to be invalid.

33. A usage parameter control circuit as claimed in claim 18, wherein the counting means is periodically reset, and at least the flag storing areas in the bridge memory are periodically made invalid.

34. A usage parameter control circuit as claimed in claim 33, wherein when the counting means is reset, the policing process for arriving cells is not performed for a predetermined time period.

35. A usage parameter control circuit as claimed in claim 12, wherein when the count value of the counting means is smaller than the certain number n each time a cell to be judged arrives, the control unit judges that the arriving cell is not in violation.

36. A usage parameter control circuit as claimed in claim 31, wherein when a hardware error is detected, the control unit resets the counting means and makes at least the flag storing areas in the bridge memory to be invalid.

37. A usage parameter control circuit as claimed in claim 10, wherein the storing capacity of the bridge memory is selected from one of a Tmax, Tmax+1, and $2^k$ (wherein k is a natural number) that is the minimum value larger than Tmax, where Tmax is the maximum value of reference threshold time intervals of plural cell types.

38. A usage parameter control circuit as claimed in claim 36, wherein when the counting means is reset, the policing process for arriving cells is not performed for a predetermined time period.

39. A usage parameter control circuit as claimed in claim 33, wherein when the counting means is reset, the policing process for arriving cells is not performed for a predetermined period.

* * * * *